United States Patent
Nakaya et al.

(10) Patent No.: US 12,296,669 B2
(45) Date of Patent: May 13, 2025

(54) FUEL TANK

(71) Applicant: YACHIYO INDUSTRY CO., LTD., Saitama (JP)

(72) Inventors: Kazunari Nakaya, Tochigi (JP); Masaki Aono, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 18/546,040

(22) PCT Filed: Jan. 17, 2022

(86) PCT No.: PCT/JP2022/001376
§ 371 (c)(1),
(2) Date: Aug. 10, 2023

(87) PCT Pub. No.: WO2022/173695
PCT Pub. Date: Aug. 18, 2022

(65) Prior Publication Data
US 2024/0123818 A1    Apr. 18, 2024

(30) Foreign Application Priority Data

Feb. 12, 2021   (JP) .................. 2021-020630

(51) Int. Cl.
*B60K 15/03*       (2006.01)
(52) U.S. Cl.
CPC .... *B60K 15/03* (2013.01); *B60K 2015/03328* (2013.01)
(58) Field of Classification Search
CPC ........................ B60K 15/03; B60K 2015/03328
(Continued)

(56) References Cited

U.S. PATENT DOCUMENTS

| 5,044,526 A | 9/1991 | Sasaki et al. |
| 6,135,306 A | 10/2000 | Clayton et al. |

(Continued)

FOREIGN PATENT DOCUMENTS

| CN | 111976467 A | * 11/2020 | ............ B60K 15/03 |
| JP | 2002-536586 A | 10/2002 | |
| JP | 2003-170751 A | 6/2003 | |
| JP | 2018-53878 A | 4/2018 | |
| JP | 2018-187853 A | 11/2018 | |

(Continued)

OTHER PUBLICATIONS

International Search Report and Written Opinion of the International Search Report for PCT/JP2022/001376 dated Mar. 22, 2022.
(Continued)

*Primary Examiner* — J. Gregory Pickett
*Assistant Examiner* — Niki M Eloshway
(74) *Attorney, Agent, or Firm* — KENEALY VAIDYA LLP

(57) ABSTRACT

A fuel tank including a built-in component is provided. The built-in component includes: a carrier part being a rigid body including a plurality of engaging parts, and a plurality of struts each including an engageable part to be engaged with one of the engaging parts. The engageable part of the strut includes an upper contact surface and a lower contact surface, which are formed spaced apart from each other in a height direction. The engaging parts of the carrier part each includes a biasing part that, when the strut is engaged with the engaging part, enters a space between the upper contact surface and the lower contact surface and generates biasing forces in directions to move the upper contact surface and the lower contact surface away from each other.

2 Claims, 26 Drawing Sheets

(58) Field of Classification Search
USPC .......................................................... 220/62
See application file for complete search history.

(56) References Cited

U.S. PATENT DOCUMENTS

| | | |
|---|---|---|
| 2015/0232226 A1 | 8/2015 | Heidemeyer et al. |
| 2017/0232835 A1* | 8/2017 | Diestelhorst ........ B29C 48/0017 |
| | | 220/562 |
| 2018/0335002 A1 | 11/2018 | Ikeya |
| 2019/0092159 A1* | 3/2019 | Amano ................ B60K 15/077 |
| 2020/0378555 A1* | 12/2020 | Boecker ........... B60K 15/03177 |
| 2021/0016655 A1* | 1/2021 | Ryu ................. B60K 15/03006 |
| 2021/0138894 A1* | 5/2021 | Ryu ....................... B65D 11/22 |

FOREIGN PATENT DOCUMENTS

| | | | |
|---|---|---|---|
| JP | 2018-192910 A | 12/2018 | |
| JP | 2021-8261 A | 1/2021 | |
| WO | 2014/053285 A1 | 4/2014 | |
| WO | WO-2021153226 A1 * | 8/2021 | ............. B29C 49/20 |

OTHER PUBLICATIONS

Written Opinion of the International Preliminary Examining Authority for PCT/JP2022/001376 dated Aug. 9, 2022.
PCT/IB/345 for PCT/JP2022/001376 dated Jun. 13, 2023.
Extended European search report for European patent application No. 22751251.4 dated Feb. 19, 2025.

* cited by examiner

FIG. 2
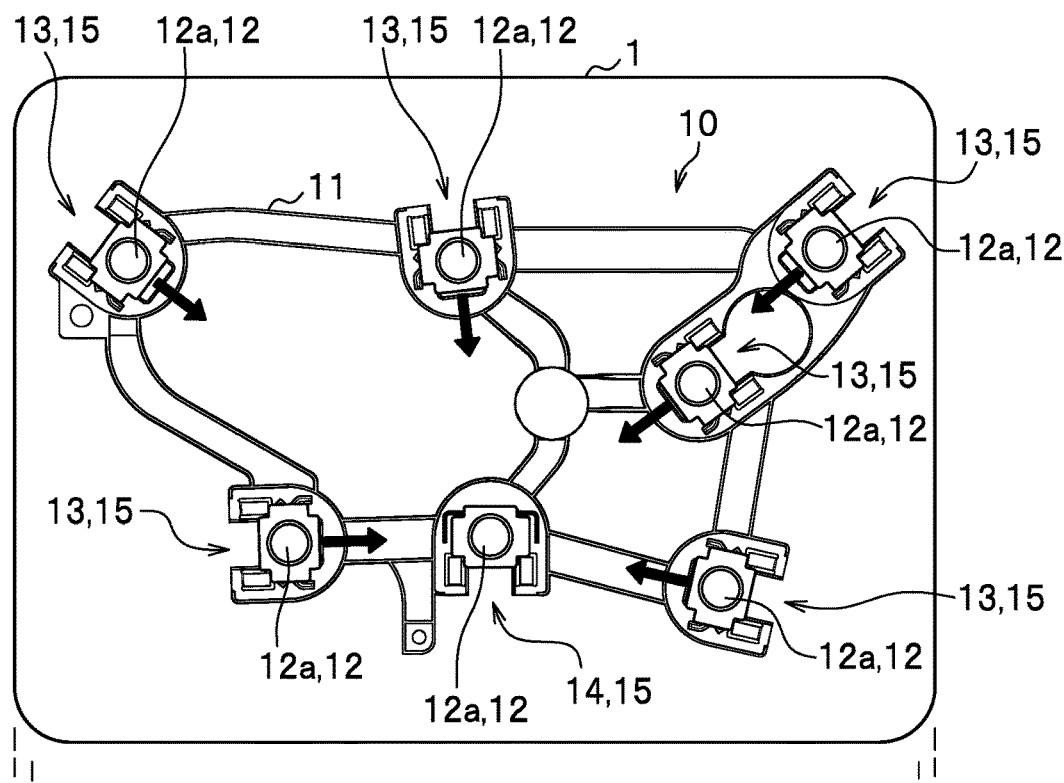
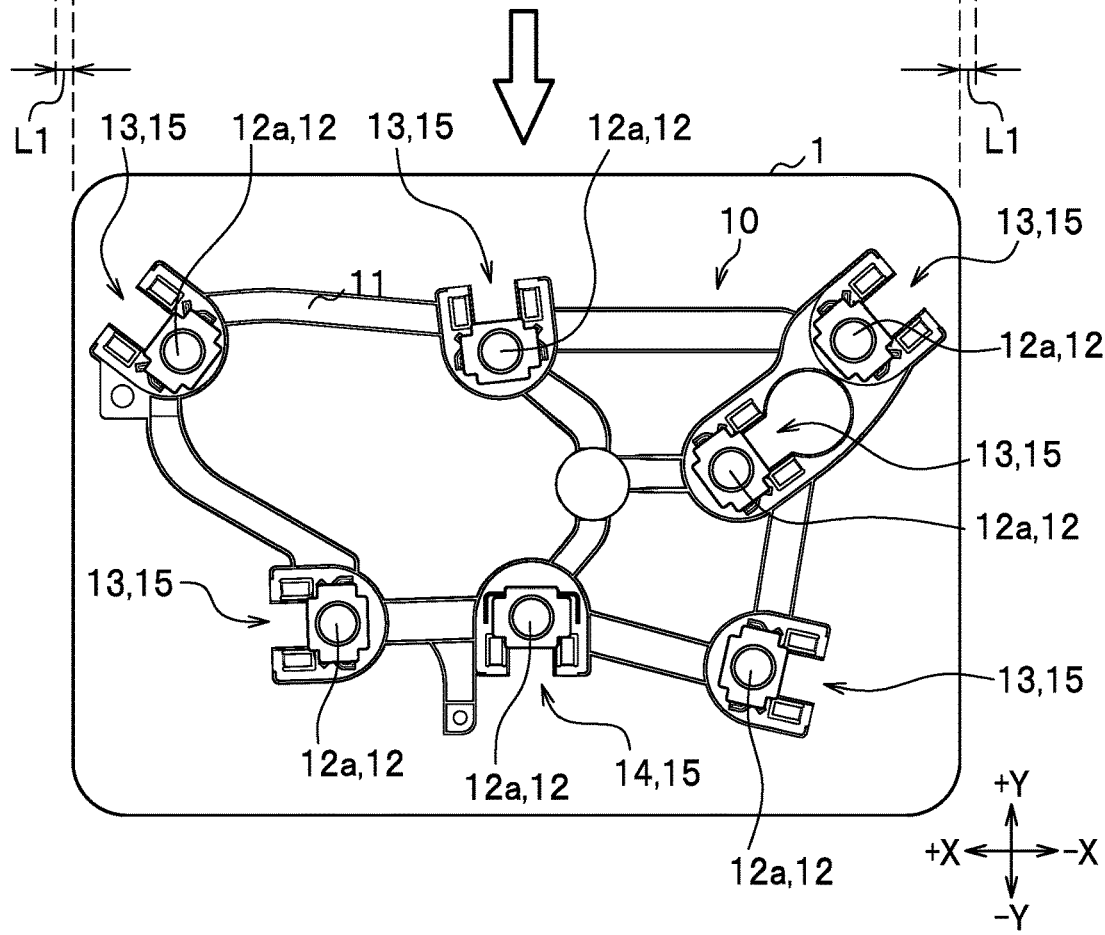

FUEL TANK

CROSS-REFERENCE TO RELATED APPLICATION

This application is a U.S. National Stage Application under 35 U.S.C § 371 of International Patent Application No. PCT/JP2022/001376 filed on 17 Jan. 2022, which claims the benefit of priority to Japanese Patent Application No. 2021-020630 filed on 12 Feb. 2021, the disclosures of all of which are hereby incorporated by reference in their entireties.

TECHNICAL FIELD

The present invention relates to a fuel tank.

BACKGROUND ART

There has been known a fuel tank manufacturing method including inserting a built-in component between a pair of molds and causing the built-in component to be fixed or welded onto an inner surface of a parison in the process of molding a fuel tank made of a resin (for example, JP2018-187853A, herein referred to as Patent Literature 1). The built-in component includes components such as struts and a valve, and a carrier part at which these components are disposed, for example. In the invention according to Patent Literature 1, for instance, after the strut and the like are disposed at the carrier part, the carrier part is transported to a space between a pair of molds by using a robot arm, and then molding is carried out while clamping the molds.

SUMMARY OF INVENTION

Technical Problem

Struts are disposed at the carrier part in the invention according to Patent Literature 1. However, if there are gaps between the carrier part and the struts, the struts may be tilted during transportation and may be fixed in the tilted state. This leads to a problem of degradation in junction strength and the occurrence of a joint failure.

In view of the above, it is an object of the present invention to provide a fuel tank achieving improved molding accuracy.

Solution to Problem

To achieve the above object, the present invention provides a fuel tank including: a built-in component, in which the built-in component includes a carrier part being a rigid body including a plurality of engaging parts, and a plurality of struts each including an engageable part to be engaged with one of the engaging parts, the engageable part of the strut includes an upper contact surface and a lower contact surface, which are formed spaced apart from each other in a height direction, and the engaging parts of the carrier part each includes a biasing part that, when the strut is engaged with the engaging part, enters a space between the upper contact surface and the lower contact surface and generates biasing forces in directions to move the upper contact surface and the lower contact surface away from each other.

According to the present invention, the struts can be kept from tilting relative to the carrier part by using the biasing forces of the biasing parts. Thus, it is possible to improve molding accuracy of the fuel tank.

It is preferable that the fuel tank further includes: a temporary engagement structure which includes a temporary lock rib provided to the biasing part and a temporary engaging part provided to the engageable part, and which brings the temporary lock rib into temporary engagement with the temporary engaging part and, when the strut and the carrier part cause a relative displacement, allows the relative displacement by releasing the temporary engagement.

In the case of molding the fuel tank, post-molding contraction may occur due to curing of a parison and the struts may therefore be fixed in a manner misaligned with the fuel tank.

However, according to the present invention, the struts and the carrier part are relatively displaced. Hence, the struts can also slide to a position following the post-molding contraction. Moreover, the provision of the temporary engagement structure makes it possible to conduct positioning between the engaging part and the strut. In this way, a sliding distance of each strut can be controlled easily so that molding accuracy can be improved further.

Further, it is preferable that the biasing part of the engaging part is a leaf spring extending in a height direction from a base part.

According to the present embodiment, it is possible to construct the biasing part easily.

Advantageous Effects of Invention

According to the present invention, it is possible to provide a fuel tank having high molding accuracy.

BRIEF DESCRIPTION OF DRAWINGS

FIG. 2 is a view to explain absorption of post-molding contraction of the fuel tank by a built-in component according to the first embodiment.

DESCRIPTION OF EMBODIMENTS

First Embodiment

Figure 1:
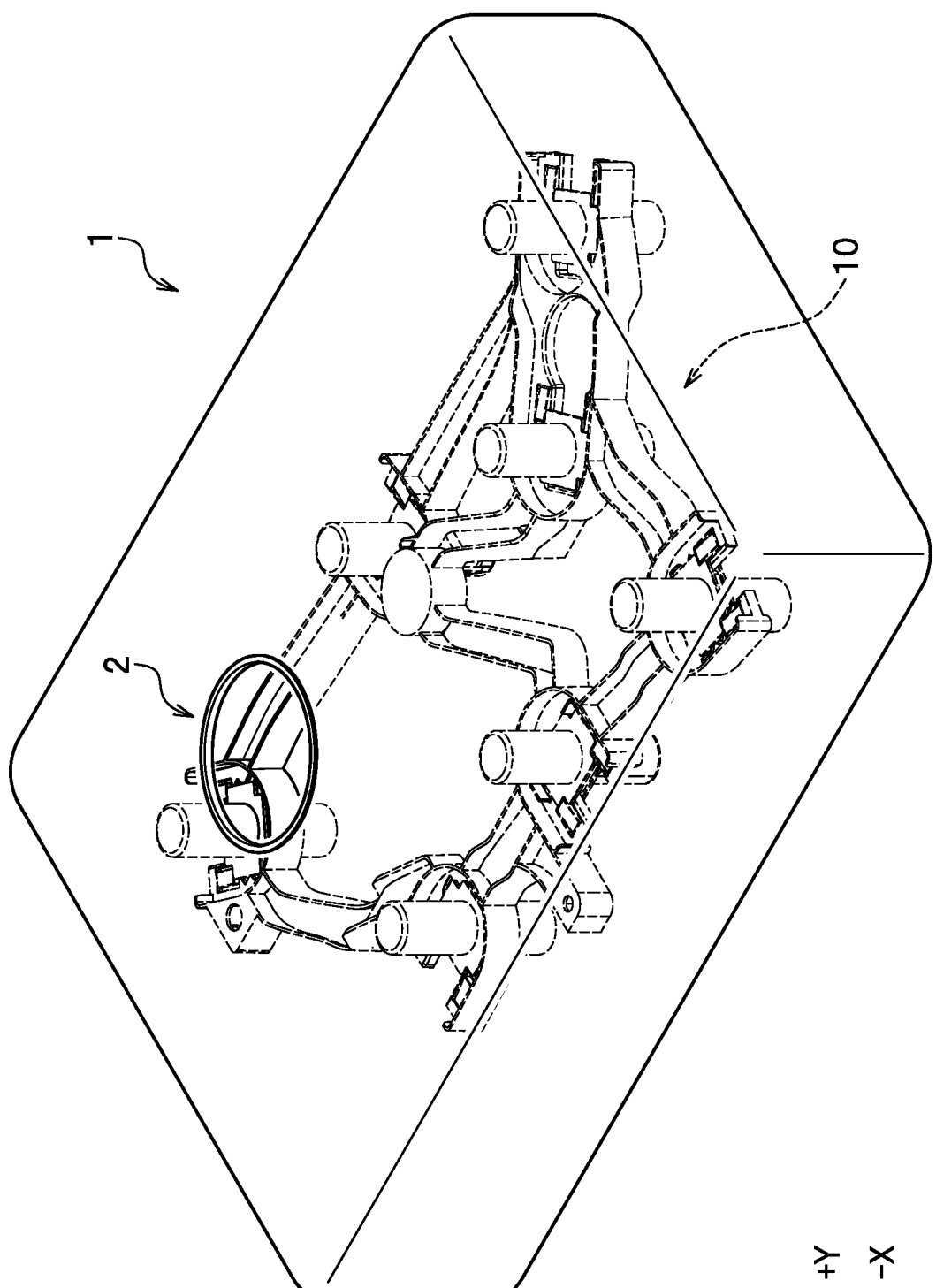
FIG. 1 is an external perspective view of a fuel tank according to a first embodiment.

A first embodiment of the present invention (the present embodiment) will be described below. It is to be noted, however, that the present invention is not limited to the following contents and the contents shown in the drawings at all, and can be embodied in various modified forms within the range not significantly damaging the effects of the present invention. In the following description, identical elements in different embodiments will be denoted by the same reference signs and duplicate explanations will be omitted. Meanwhile, the elements having the same functions will use the same names and redundant explanations will be omitted.

FIG. 1 is an external perspective view of a fuel tank 1 according to a first embodiment. In the example shown in the drawing, the fuel tank 1 is formed into a box shape of which x direction is defined as a width, y direction is defined as a depth, and z direction is defined as a height. The fuel tank 1 is used for an automobile, for example, and is capable of containing a fuel such as gasoline and light oil. The fuel tank 1 includes an opening 2 at which an oil feed pump (not shown) can be installed. The fuel contained in the fuel tank 1 can be sent to an engine (not shown) by using the oil feed pump.

The fuel tank 1 incorporates a built-in component 10 (to be described later). The built-in component 10 can be disposed inside the fuel tank 1 during blow forming of the fuel tank 1, for example. Specifically, the built-in component 10 can be disposed inside the fuel tank 1 by disposing the built-in component 10 inside a parison in a cylindrical shape (not shown) or between a pair of parisons in a sheet shape and molding and cooling the parison or pairsons in this state.

The built-in component 10 is designed to absorb post-molding contraction of the fuel tank 1 which occurs during cooling after the blow molding, and to absorb expansion or contraction of the fuel tank 1 due to a positive pressure or a negative pressure therein or dissipate waves which occur during use. The post-molding contraction will be described with reference to FIGS. 2 and 3.

FIG. 2 is a view to explain absorption of the post-molding contraction of the fuel tank 1 by using the built-in component 10 according to the first embodiment. In FIG. 2, the inside of the fuel tank 1 is visualized for the convenience of illustration. A specific configuration of the built-in component 10 will be described later with reference to FIG. 3 and so forth. The built-in component 10 is fixed to the parison (not shown) being a constituent material of the fuel tank 1 by using an upper surface 12a and a lower surface (not shown) of each of struts 12 engaged with engaging parts 15. As a consequence, a force acts on each strut 12 in a direction of contraction of the fuel tank 1 during the post-molding contraction that occurs due to cooling of the parison.

The post-molding contraction is usually homologous deformation. For this reason, the force directed to the fixed strut 12 (the strut 12 fitted into or engaged with a fixed engaging part 14 to be described later) acts on the slidable (movable) strut 12 (the strut 12 fitted into or engaged with a slidable engaging part 13 to be described later). The direction of this force is indicated with a black arrow in an upper view in FIG. 2. When the force acts on the strut 12 due to the post-molding contraction at a length L1, the slidable strut 12 slides toward one strut 12 that is fixed. A lower view in FIG. 2 shows the built-in component 10 after the sliding.

As described above, the post-molding contraction corresponding to the homologous deformation can be absorbed by the sliding of the slidable struts 12 toward the fixed strut 12, so that separation or detachment of the struts 12 from an inner wall of the fuel tank 1 due to the post-molding contraction can be suppressed. As a consequence, it is possible to hold the built-in component 10 inside the fuel tank 1 even after the post-molding contraction, and to suppress deformation of the fuel tank 1 during use by virtue of the built-in component 10.

Figure 3:
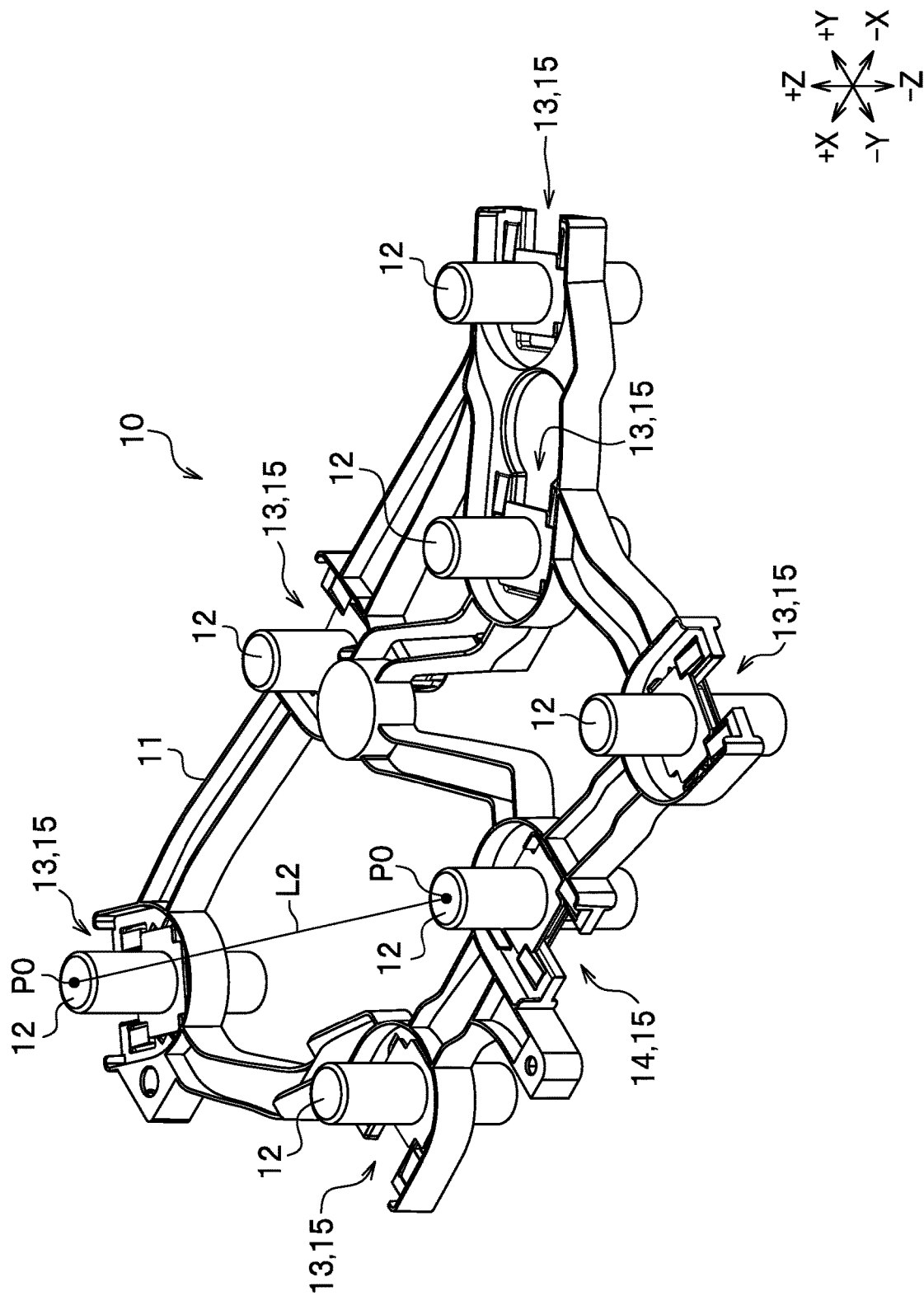
FIG. 3 is an external perspective view of the built-in component according to the first embodiment.

FIG. 3 is an external perspective view of the built-in component 10 according to the first embodiment. The built-in component 10 includes a carrier part 11, the struts 12, the slidable engaging parts 13, and the fixed engaging part 14. A distance between the strut 12 corresponding to the slidable engaging part 13 having the largest displacement on xy plane and the strut 12 corresponding to the fixed engaging part 14 is equivalent to a length L2, for example. Note that the distance between the struts 12 and 12 corresponds to a distance between centers PO and PO of the columnar struts 12. In the example shown in the drawing, some of the distances between the struts 12 and 12 are equal while others are different. Nonetheless, all of the distances may be equal to or different from one another.

Figure 5:
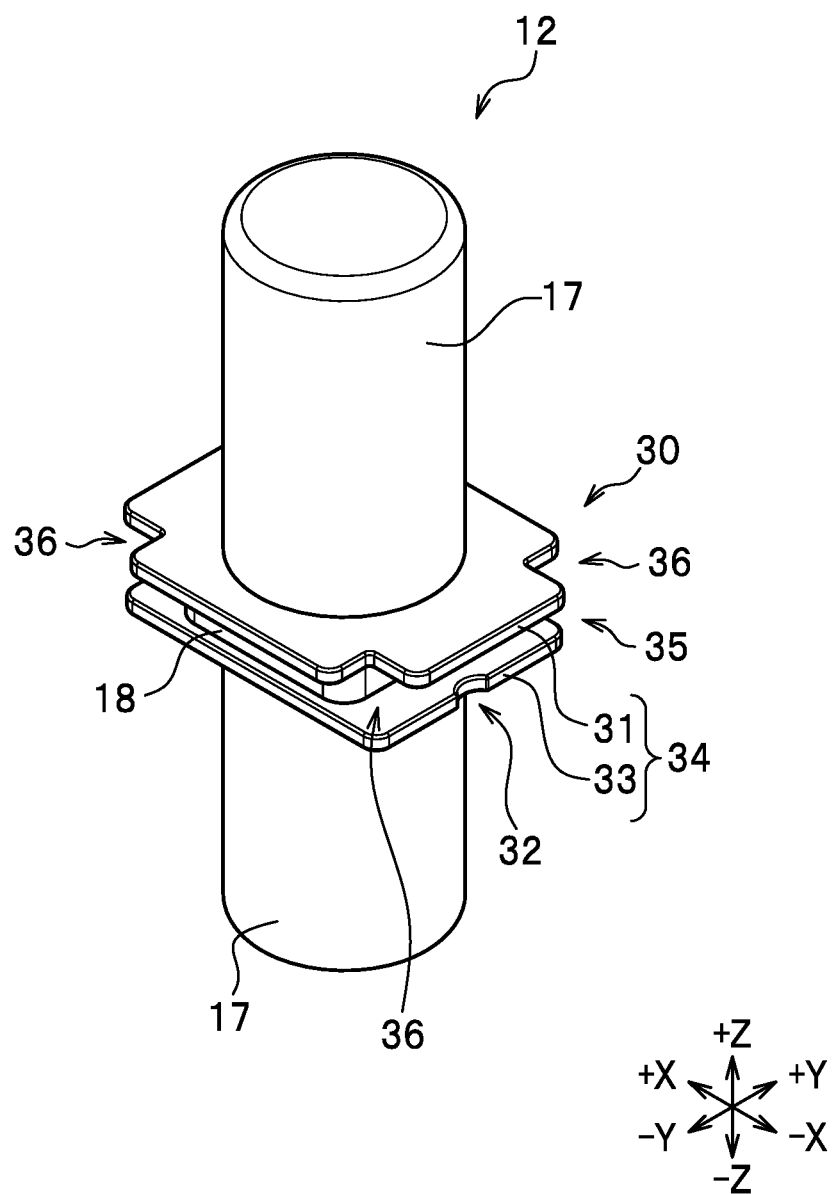
FIG. 5 is a perspective view of a strut according to the first embodiment.

The carrier part 11 is a rigid body provided with the engaging parts 15. Each engaging part 15 is designed to engage with an engageable part 30 (FIG. 5). It is possible to suppress deformation of the carrier part 11 associated with the post-molding contraction of the fuel tank 1 by forming the carrier part 11 into the rigid body. Meanwhile, when the built-in component 10 is disposed inside the fuel tank 1, it is possible to suppress flexure of the built-in component 10. Accordingly, the built-in component 10 can be accurately disposed inside the fuel tank 1. There are provided a number of engaging parts 15, which are seven in the example shown in the drawing. This number may be equal to or above two and equal to or below six, or equal to or above eight.

In the example shown in the drawing, the carrier part 11 is formed into a frame shape that extends both in the x direction and in the y direction. The rigidity of the carrier part 11 can be improved by forming the carrier part 11 into the frame shape. The carrier part 11 is made of a thermoplastic resin such as polyethylene and polystyrene. The shape of the carrier part 11 will be described with reference to FIG. 4.

Figure 4:
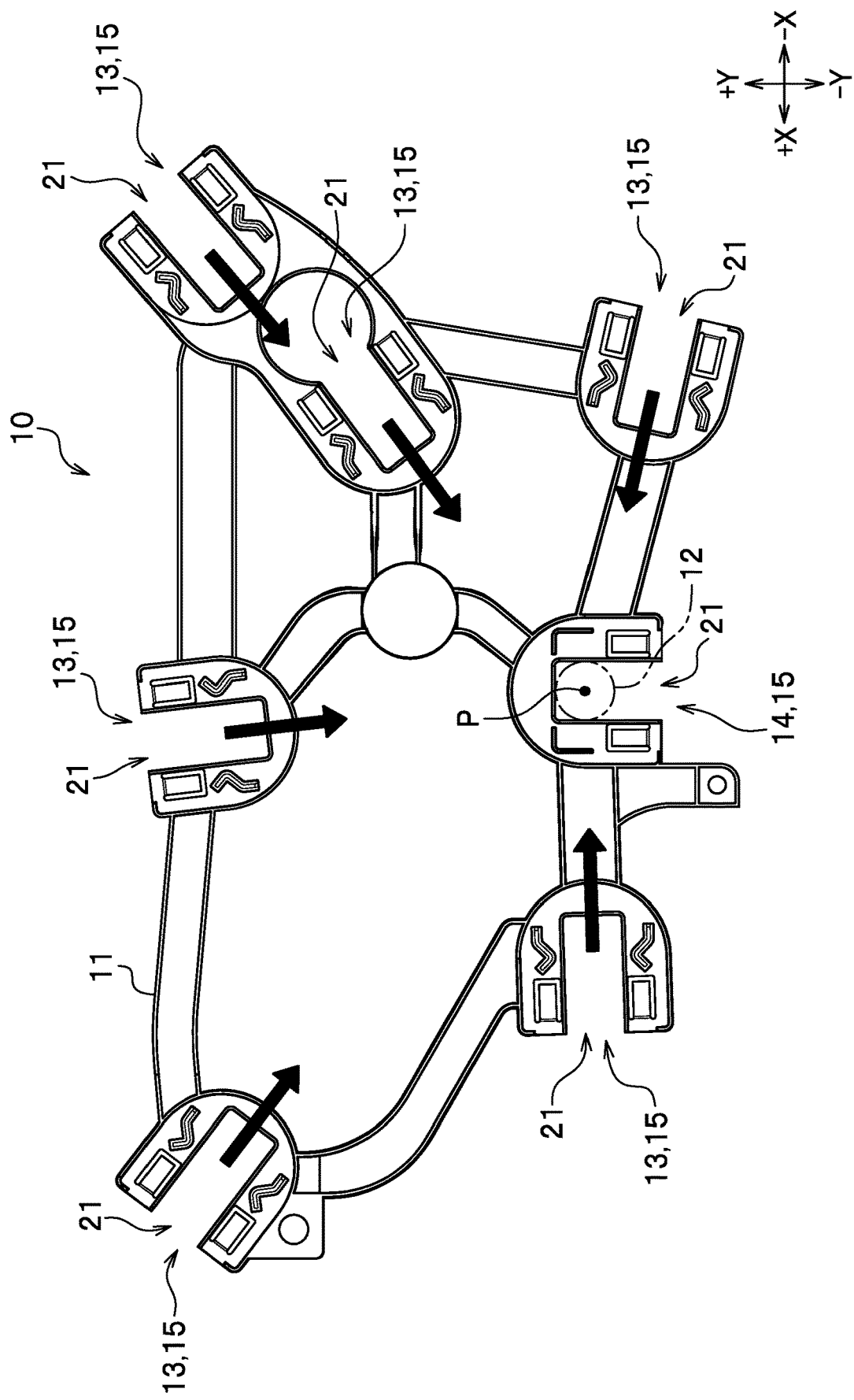
FIG. 4 is a top view of the built-in component according to the first embodiment, which is a top view showing a state where struts are detached.

FIG. 4 is a top view of the built-in component 10 according to the first embodiment, which shows a state where the struts 12 are detached. The built-in component 10, or more specifically, the engaging parts 15 include the slidable engaging parts 13 and the fixed engaging part 14. The slidable engaging part 13 is designed such that the engageable part 30 (FIGS. 3 and 5) of the strut 12 (FIGS. 3 and 5) is slidably fitted into and thus engaged with the engaging part 15 (the slidable engaging part 13 in this case) of the carrier part 11 along with the post-molding contraction of the fuel tank 1 (FIG. 1). In the present specification, a sliding direction of the strut 12 in the post-molding contraction will be defined as a slidable direction. The slidable direction is a direction indicated with a black arrow in FIG. 4. At least one slidable engaging part 13 is provided. There are six slidable engaging parts in the example shown in the drawing. However, the number may be equal to or above two and equal to or below five, or equal to or above seven.

The fixed engaging part 14 is designed such that the engageable part 30 (FIGS. 3 and 5) of the strut 12 (FIGS. 3 and 5) is fitted into and thus engaged with the engaging part 15 (the fixed engaging part 14 in this case) of the carrier part 11 so as not to allow sliding movement of the strut 12. Only one fixed engaging part 14 is provided in the example shown in the drawing. FIG. 4 shows the simplified strut 12 to be engaged with the fixed engaging part 14. A point P is an axial center of the strut 12.

As indicated with the black arrows in FIG. 4, the slidable direction of at least one (which may be only one) of the slidable engaging parts 13 is set to a direction toward the fixed engaging part 14. In the example shown in the drawing, the slidable direction of each of the slidable engaging parts 13 passes through the point P of the strut 12 (FIGS. 3 and 5) that includes the engageable part 30 (FIGS. 3 and 5) engaged with the fixed engaging part 14. The post-molding contraction can be absorbed by setting the slidable direction to the direction toward the fixed engaging part 14.

At least any of one side or another side in the slidable direction of the slidable engaging part 13 is open. An open part 21 is formed on the open side. By opening one of these sides, it is possible to engage the engageable part 30 (FIGS. 3 and 5) of the strut 12 with the slidable engaging part 13 from the open side. In the example shown in the drawing, the open part 21 is formed by opening a portion of the slidable engaging part 13 on the opposite side of the fixed engaging part 14. In this way, the engageable part 30 can be prevented from coming off the open part 21 even when the engageable part 30 slides in the direction indicated with the black arrow in FIG. 4 due to the post-molding contraction.

FIG. 5 is a perspective view of the strut 12 according to the first embodiment. In the example shown in the drawing, the strut 12 is engageable with all the engaging parts 15 including the slidable engaging parts 13 and the fixed engaging part 14. Instead, the shape of the strut 12 to be engaged with the slidable engaging part 13 may be different from the shape of the strut 12 to be engaged with the fixed engaging part 14, for example.

The strut 12 includes support poles 17 each formed into a columnar shape, and the engageable part 30. The engageable part 30 is designed to be engaged with each of the engaging parts 15 of the carrier part 11. The support poles 17 of the same shape extend in the +z direction and the −z direction from the engageable part 30, respectively. The engageable part 30 includes a flat plate 31 in a rectangular shape or a generally rectangular shape provided with notches 36 on four corners. The engageable part 30 includes a flat plate 33 in a rectangular shape or a generally rectangular shape provided with notches 32 on two sides opposed to each other out of four sides (only the notch 32 formed on one of the sides is shown in the drawing). The generally rectangular shape means a shape that is not a rectangle in a strict sense but is substantially a rectangle when viewed from above. To be more precise, the substantially rectangular shape is a shape provided with corners formed into an R-shape by chamfering instead of forming right angles, for example.

The engageable part 30 includes a clamp part 35. The clamp part 35 is designed to be engaged with the engaging part 15 (FIG. 2) by way of clamping with a group of flat plates 34 including the pair of flat plates 31 and 33 disposed to face each other. The clamp part 35 includes a prism 18 being located between the pair of flat plates 31 and 33 and having the same dimensions as a length L3 in the x-axis direction and a length L4 in the z-axis direction of the open part 21, both as shown in FIG. 6.

Figure 6:
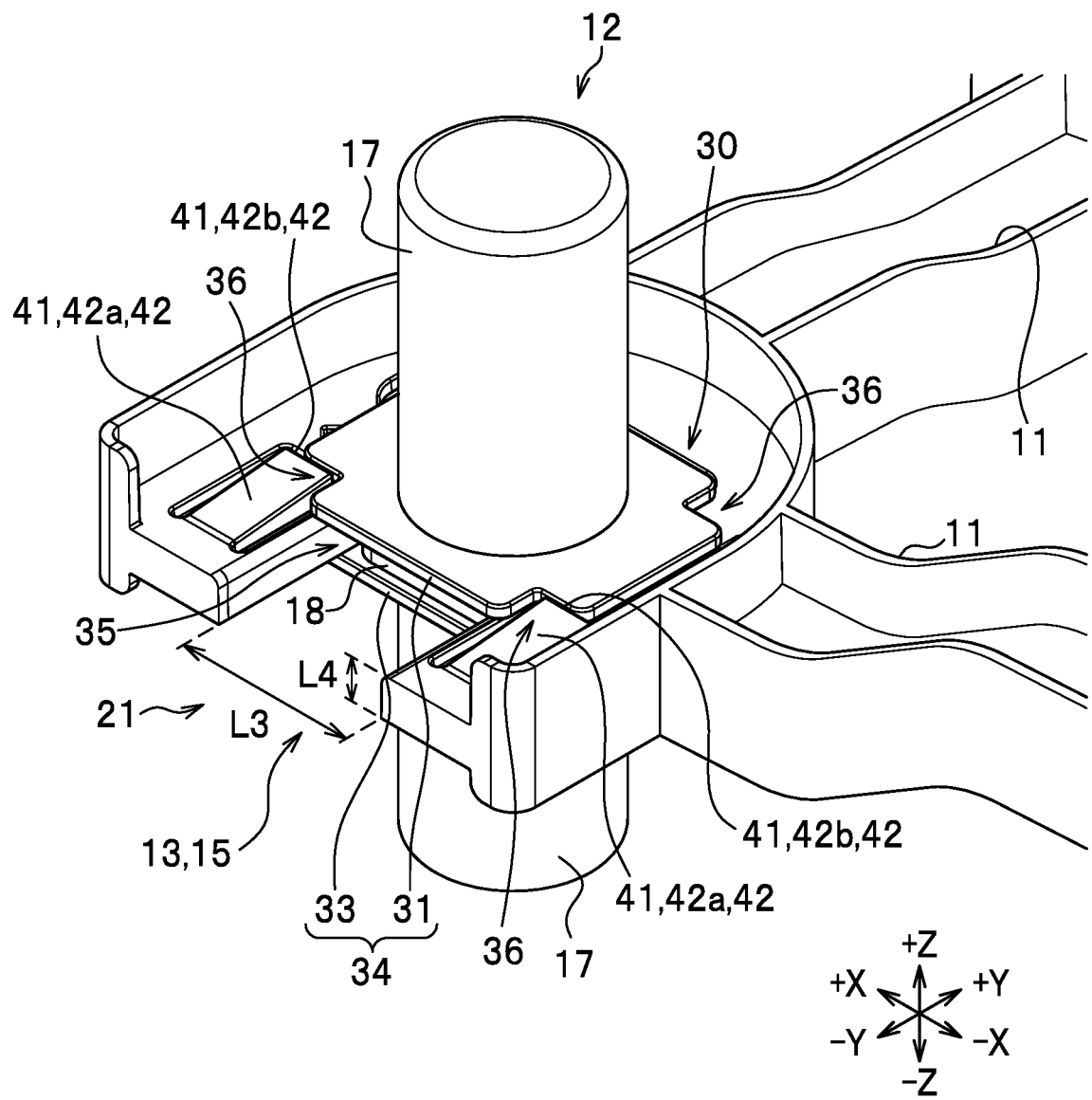
FIG. 6 is a perspective view showing a state where an engageable part of the strut is engaged with a slidable engaging part according to the first embodiment.

FIG. 6 is a perspective view showing a state where the engageable part 30 of the strut 12 is engaged with the slidable engaging part 13 according to the first embodiment. A length in the x direction (a width) of the open part 21 is equivalent to the length L3. A length in the x direction (a portion where the clamp part 35 is clamped) of the slidable engaging part 13 is equivalent to the length L3 across the entire region in the y direction of the slidable engaging part 13. A length in the z direction (a height) of the open part 21 is equivalent to the length L4. A length in the z direction (the portion where the clamp part 35 is clamped) of the slidable engaging part 13 is also equivalent to the length L4. Accordingly, it is possible to engage the engageable part 30 with the slidable engaging part 13 by inserting the engageable part 30 into the slidable engaging part 13 through the open part 21.

The slidable engaging part 13 includes sliding restriction members 41 that restrict sliding of the engageable part 30 to the open side where the open part 21 is formed. Provision of the sliding restriction members 41 makes it possible to keep the engageable part 30, which is engaged with the slidable engaging part 13, from coming off through the open part 21.

Each sliding restriction member 41 is a claw 42 provided with an inclined surface 42a that rises from the open side (the −y direction) where the open part 21 is formed toward a back side (the +y direction). By cutting out three sides of the claw 42 except a front side thereof, a rear end of the claw 42 is formed into a free end so that the claw 42 is elastically deformable. By providing the claw 42, the engageable part 30 can slide in the +y direction in such a way as to push the inclined surface 42a in the −z direction when the engageable part 30 is inserted from the open part 21. Then, after getting over an end portion 42b on the back side of the claw 42, the inclined surface 42a flips up in the +z direction due to a reactive force, so that the engageable part 30 can be locked with the slidable engaging part 13.

Figure 7:
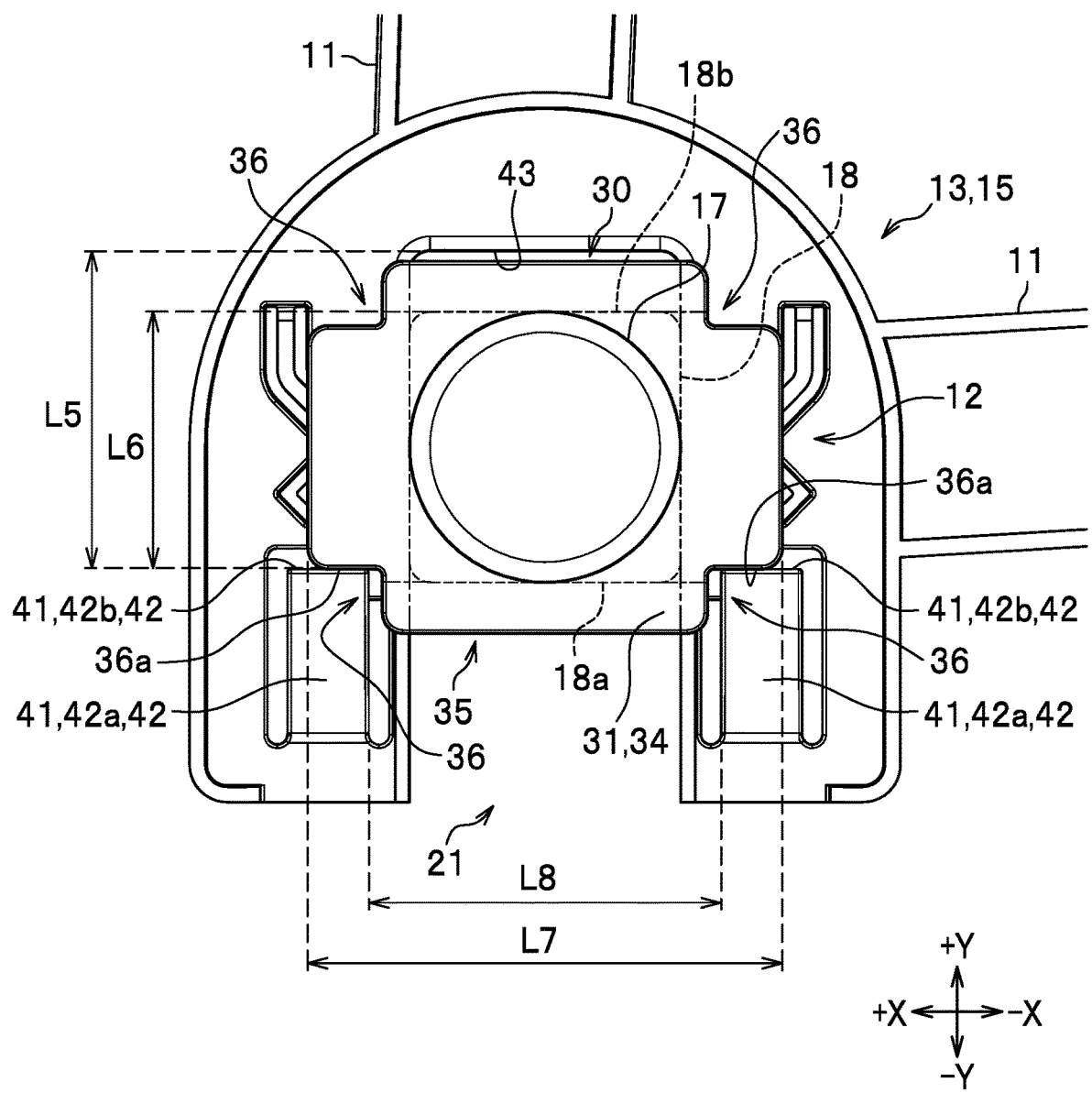
FIG. 7 is a top view of FIG. 6.

FIG. 7 is a top view of FIG. 6. FIG. 7 is the view seen from the +z direction to the −z direction in FIG. 6. The lock of the engageable part 30 with the slidable engaging part 13 is carried out by bringing end surfaces 36a of the two notches 36 on the open part 21 side into contact with end parts 42b of the claws 42. When locking the notches 36 by using the claws 42, a position in the y direction of the end part 42b of the claw 42 substantially coincides with a position in the y direction of an end part 18a on a front side of the prism 18.

In the slidable engaging part 13, a distance between an end surface 43 that is present on the back side (the opposite side of the open part 21) when viewed from the open part 21 and the end part 42b of the claw 42 is equivalent to a length L5. In the strut 12, a distance between an end surface 18b in the +y direction of the prism 18 and the end surface 36a in the −y direction of the notch 36 is equivalent to a length L6.

The length L5 is greater than the length L6. Accordingly, the strut 12 slides in a slidable region defined between the end surface 43 and the end part 42b. A sliding amount in sliding in the slidable region is equivalent to a length obtained by subtracting the length L6 from the length L5.

A length in the x direction of the flat plate 31 is equivalent to a length L7. An interval between the sliding restriction members 41 and 41 is equivalent to a length L8. The length L7 is greater than the length L8. Accordingly, even in an attempt to slidably move the flat plate 31 to the open part 21 side, the flat plate 31 gets caught on the sliding restriction members 41 and 41, so that the strut 12 can be disposed between the end surface 43 of the slidable engaging part 13 and the end part 42b of the claw 42.

Figure 8:
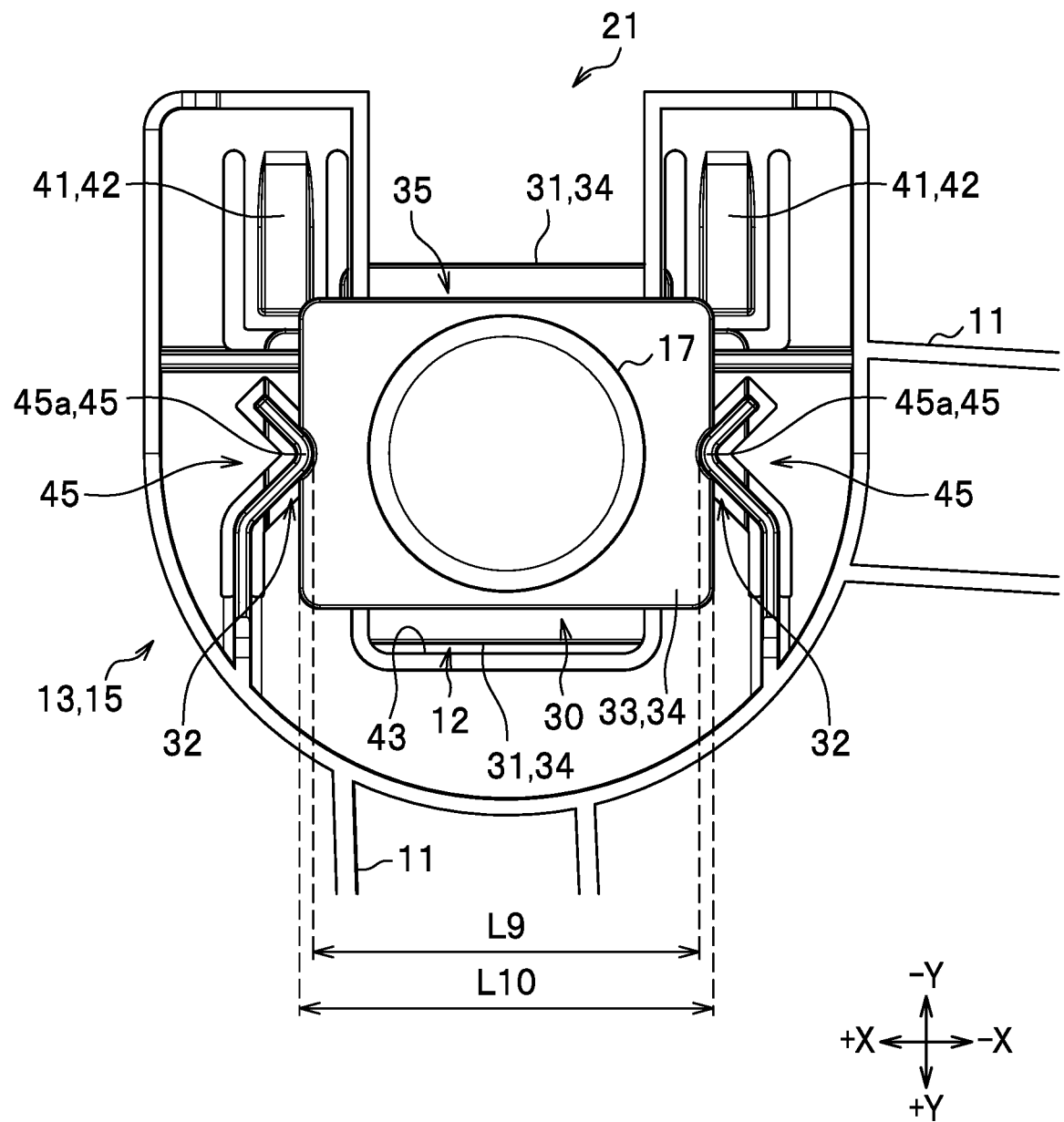
FIG. 8 is a bottom view of FIG. 6.

FIG. 8 is a bottom view of FIG. 6. FIG. 8 is the view seen from the −z direction to the +z direction in FIG. 6. FIG. 8 shows a state where the end surfaces 36a (FIG. 7) of the two notches 36 (FIG. 7) on the open part 21 side are in contact with the end parts 42b (FIG. 7) of the claws 42.

As described above, the flat plate 33 includes the notches 32 on the two sides opposed to each other out of the four sides. The slidable engaging part 13 includes lock parts 45 located at positions opposed to the notches 32 and designed to lock the engageable part 30 in a temporary state of being engaged with the slidable engaging part 13. The temporary state mentioned herein is a state before the post-molding contraction, or more specifically, a state before cooling the parison after the blow molding in the state of disposing the built-in component 10, for example. Accordingly, the slidable engaging part 13 includes a positioning mechanism in the slidable direction (the y direction) formed form the lock parts 45. Each lock part 45 is a leaf spring formed such that a bent part 45a is engaged with the notch 32 when a stress is not applied thereto, for example. By providing the lock parts 45, it is possible to lock the strut 12 in the temporary state where the engageable part 30 is engaged with the slidable engaging parts 13. Thus, the built-in component 10 can be disposed in the fuel tank 1 in the state of locking the struts 12.

The pair of lock parts 45 are provided in such a way as to clamp the strut 12. A length in the x direction between the pair of lock parts 45 and 45 is equivalent to a length L9. Note that a length in the x direction between the notches 32 and 32 provided on the two sides opposed to each other is also equivalent to the length L9. Meanwhile, a length in the x direction of the flat plate 33 is equivalent to a length L10. The length L10 is greater than the length L9. Accordingly, the strut 12 provided with the flat plate 33 can be locked by using the lock parts 45.

Figure 9:
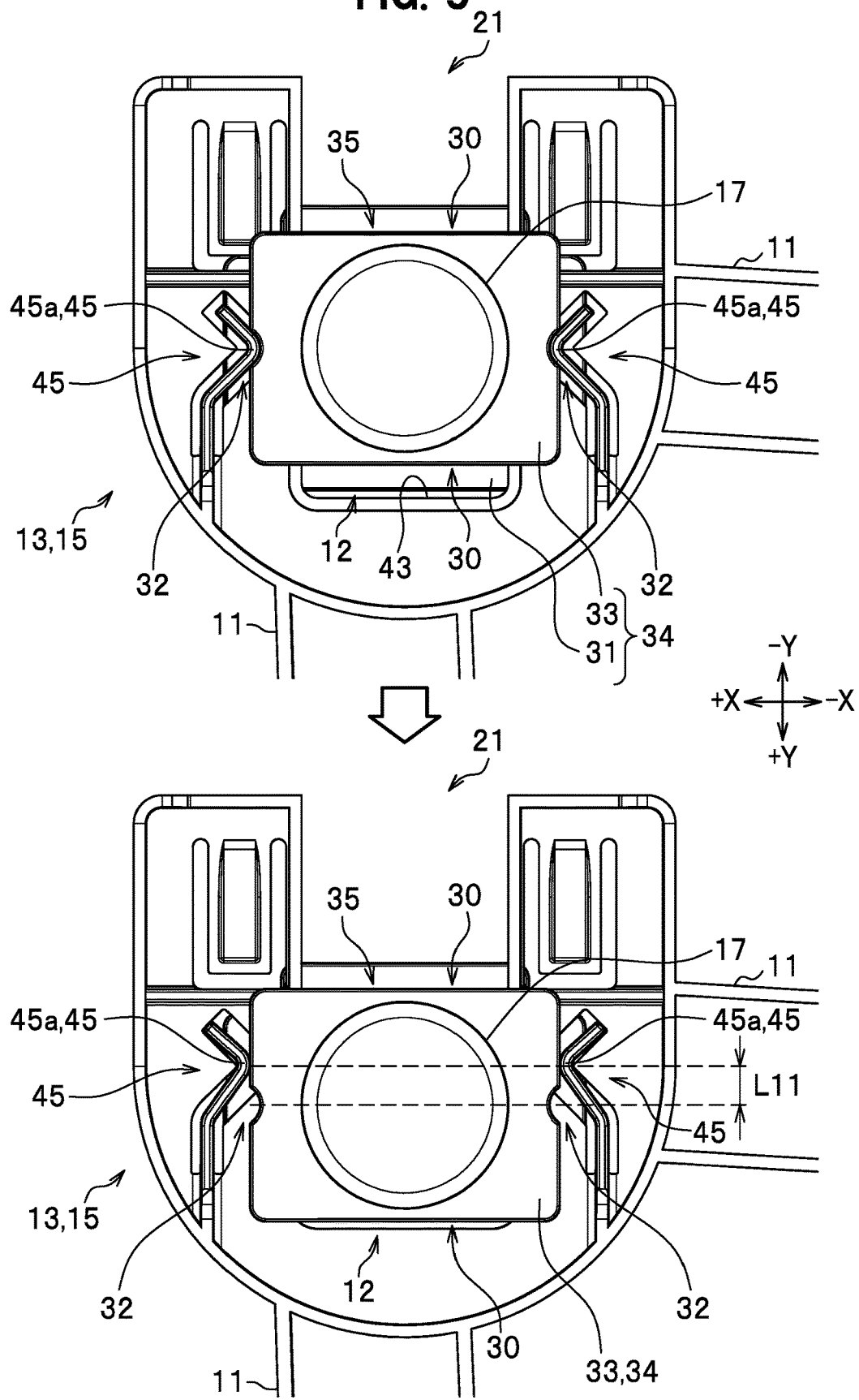
FIG. 9 shows views to explain a movement of the strut in post-molding contraction in the first embodiment.

FIG. 9 shows views to explain a movement of the strut 12 in the post-molding contraction in the first embodiment. As shown in an upper view of FIG. 9 (the same state as that in FIG. 8), the notches 32 are locked with the lock parts 45 in the temporary state. In this instance, the interval in the x direction between the lock parts 45 and 45 is equivalent to the length L9 (FIG. 8), which is equal to the interval in the x direction between the notches 32 and 32.

As described with reference to FIG. 2, during the post-molding contraction of the fuel tank 1 (FIG. 1) in the locked state with the lock parts 45, each strut 12 moves in the state where the position (the xy position) of the engaging part 15 is maintained, that is, in the state where the position of the carrier part 11 is maintained. As a consequence, the lock with the lock parts 45 is released and the strut 12 slides toward the fixed engaging part 14 in the slidable region. Since the strut 12 releases the lock and slides toward the fixed engaging part 14 during the post-molding contraction, the built-in component 10 disposed in the state of locking the struts 12 can absorb the post-molding contraction corresponding to the homologous deformation as shown in FIG. 2 mentioned above.

As shown in a lower view in FIG. 9, the strut 12 moves by a sliding amount L11. The sliding amount L11 of the strut 12 can be determined from a distance between the slidable engaging part 13 and the fixed engaging part 14, and a shrinkage factor of a material constituting the parison that contains the built-in component 10 (the member in the fuel tank 1 to be subjected to the post-molding contraction). The distance between the slidable engaging part 13 and the fixed engaging part 14 is determined for each strut 12 that determines the sliding amount L11. In the example shown in FIG. 3 mentioned above, for instance, the sliding amount of the strut 12 of the slidable engaging part 13 having the largest displacement on the xy plane can be determined based on the length L2 being the distance from the strut 12 of the fixed engaging part 14 on the xy plane. Meanwhile, the shrinkage factor of the material constituting the parison to contain the built-in component 10 may be selected from known values depending on the constituent material or may be determined by experiments and the like.

When it is possible to grasp the shrinkage factor between a point before the post-molding contraction and a point after the post-molding contraction, it is possible to calculate the magnitude of the post-molding contraction, that is, the sliding amount L11 of the strut 12 by multiplying the above-mentioned distance by the above-mentioned shrinkage factor. The strut 12 slides in the slidable region having the length L5 (FIG. 7) in the y direction, which is defined between the end surface 43 of the slidable engaging part 13 and the end parts 42b of the claws 42. Meanwhile, the length L6 (see FIG. 7) is equivalent to the distance between the end surface 18b in the +y direction of the prism 18 and the end surface 36a in the −y direction of the notch 36 as described above. Accordingly, if the value obtained by subtracting the length L6 from the length L5 representing a sliding portion is equal to or above the sliding amount L11, it is possible to inhibit restriction on the movement by the slidable engaging part 13 during the post-molding contraction.

As described above, the length (the length L5) in the slidable direction of the slidable region is preferably the value determined based on the distance (which is the length L2 in the example in FIG. 3) between the slidable engaging part 13 and the fixed engaging part 14, and on the shrinkage factor of the material constituting the parison that contains the above-described built-in component. In this way, it is possible to provide the sufficient slidable region while estimating the sliding amount during the post-molding contraction.

Figure 10:
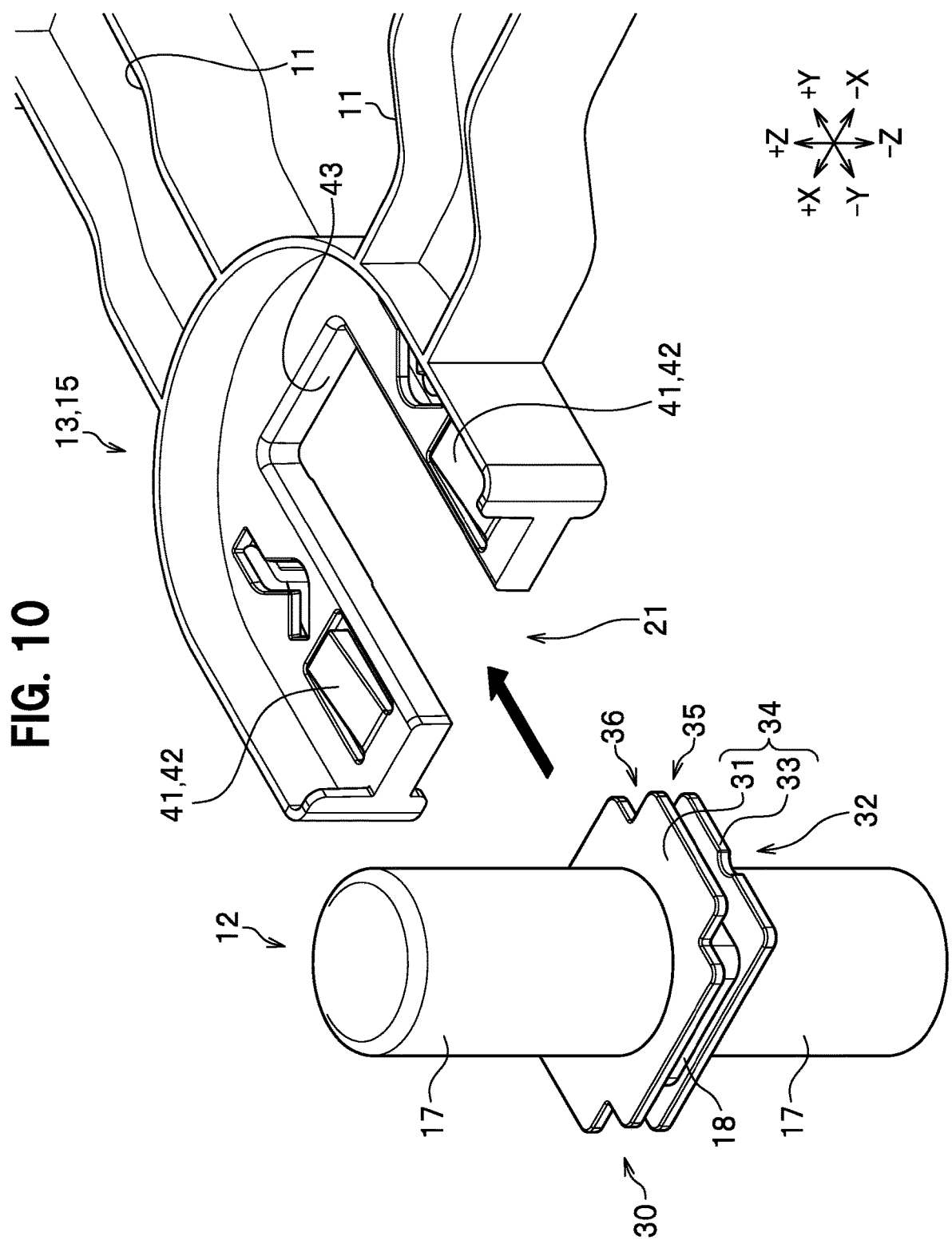
FIG. 10 is a view to explain fastening of the strut to the slidable engaging part according to the first embodiment.

FIG. 10 is a view to explain fastening of the strut 12 to the slidable engaging part 13 according to the first embodiment. The strut 12 is fastened to the slidable engaging part 13 by inserting the strut 12 into the open part 21 as indicated with a black arrow. The strut 12 is inserted into the open part 21 such that a direction to dispose the sliding restriction members 41 and 41 (the x direction) and a longitudinal direction of the flat plate 31 having the length L5 are aligned in the same direction. Thus, the strut 12 is fastened to the slidable engaging part 13 as shown in FIGS. 6 to 8.

When fastening the strut 12, a fastening error (a fastening defect) occurs in a case of an attempt to fasten the strut 12 to the slidable engaging part 13 in a different direction from the direction of the strut 12 shown in FIG. 10. The built-in component 10 can detect such a fastening error.

Figure 11:
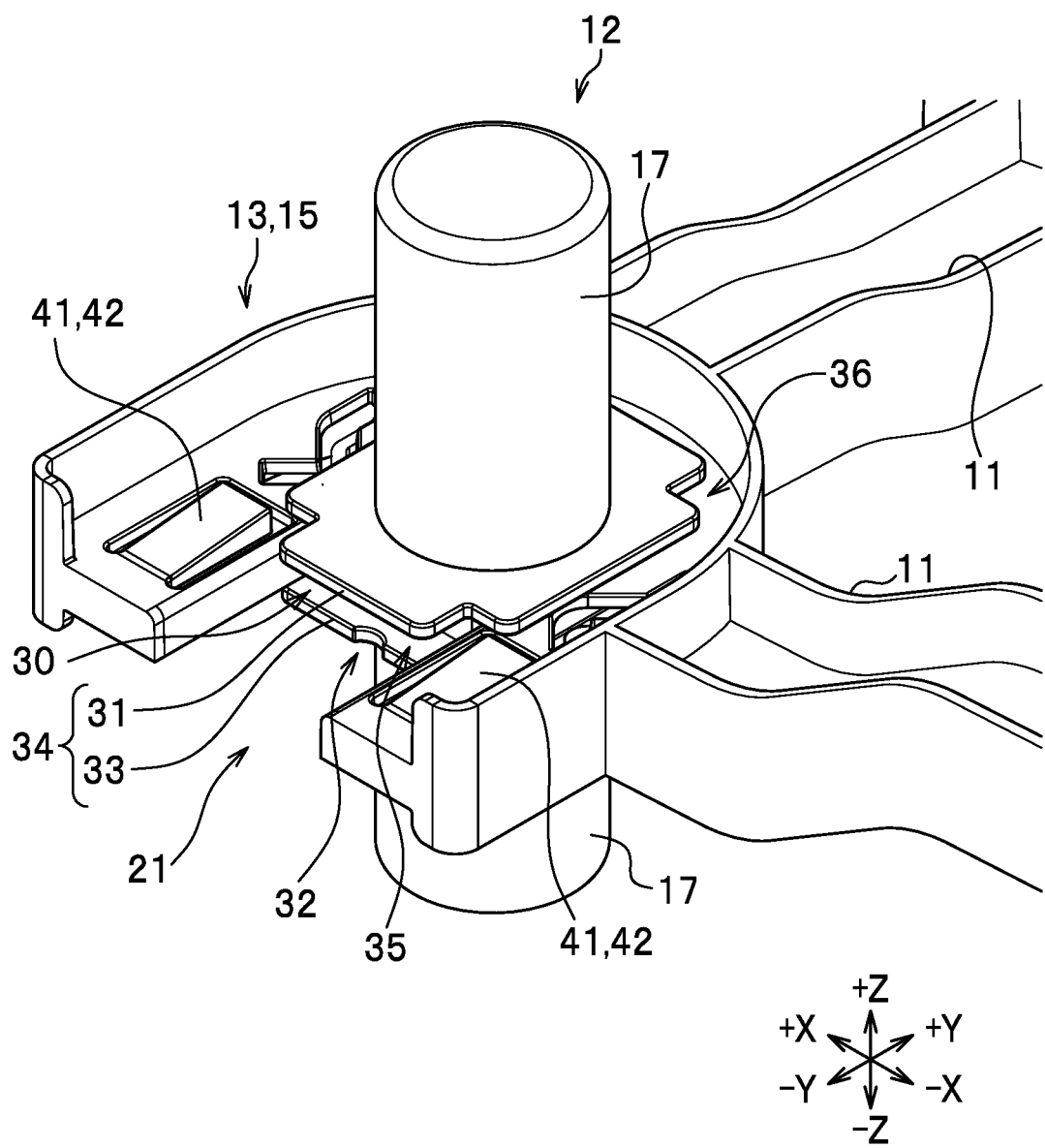
FIG. 11 is a view to explain a case of occurrence of a fastening error in the fastening in FIG. 10.

FIG. 11 is a view to explain the case of occurrence of the fastening error in fastening in FIG. 10. The example in FIG. 11 shows an aspect of inserting the strut 12 into the open part 21 in the state of turning the strut 12 by 90° within the xy plane relative to the direction of the strut 12 shown in FIG. 10.

Figure 12:
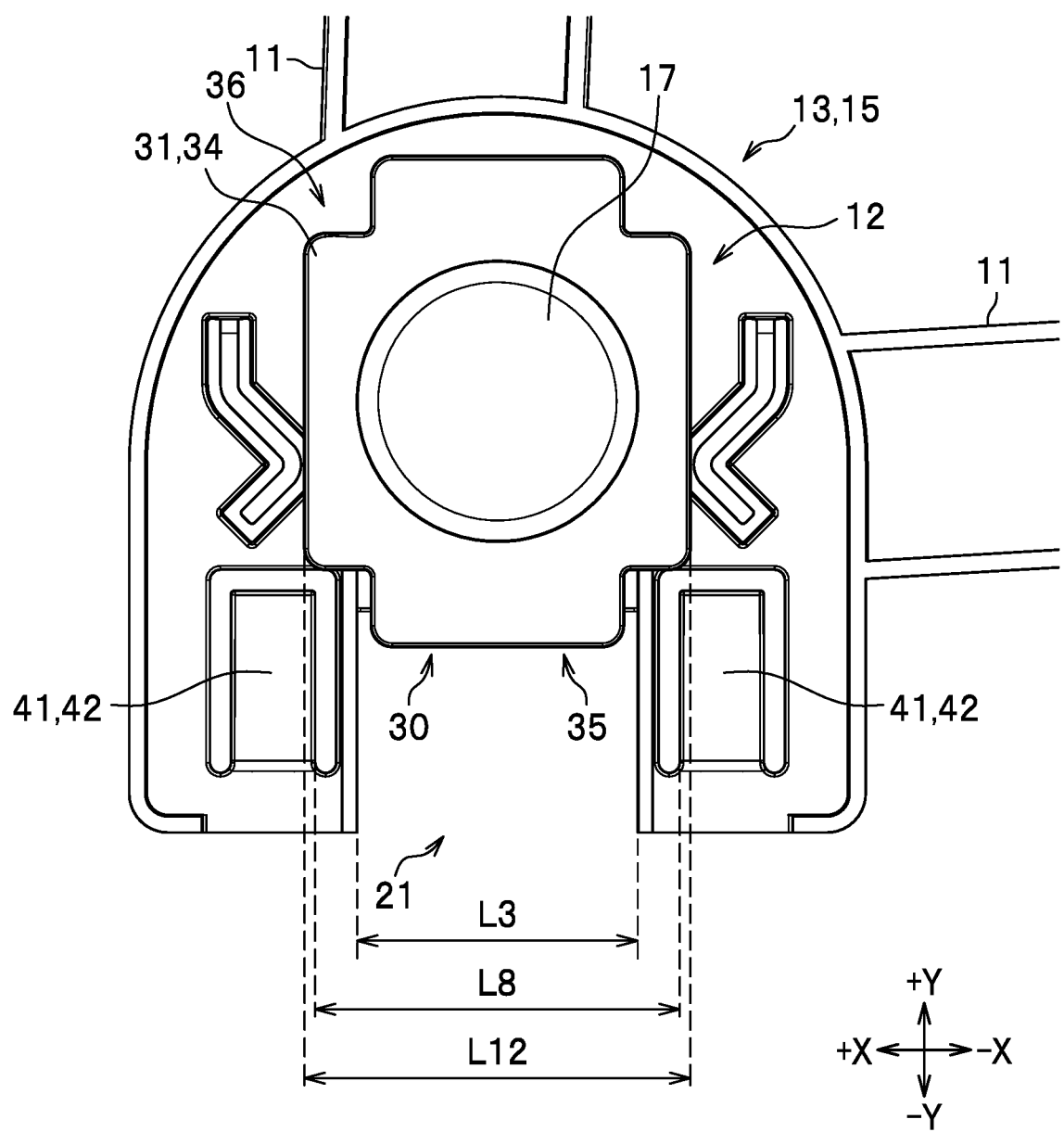
FIG. 12 is a top view of FIG. 10.

FIG. 12 is a top view of FIG. 10. In the example shown in the drawing, a length in a traverse direction of the flat plate 31 is equivalent to a length L12. The length L12 is greater than the length L3 in the x direction of the open part 21. For this reason, the engageable part 30 is engaged with the slidable engaging part 13 even when the strut 12 in the state of being turned by 90° within the xy plane from the direction of the strut 12 shown in FIG. 10 is inserted into the open part 21. Meanwhile, the length L12 is greater than the length L8 of the interval between the sliding restriction members 41 and 41. For this reason, the sliding of the flat plate 31 to the open part 21 side is restricted by the sliding restriction members 41 even when the strut 12 in the state of being turned by 90° within the xy plane from the direction of the strut 12 shown in FIG. 10 is inserted into the open part 21.

Figure 13:
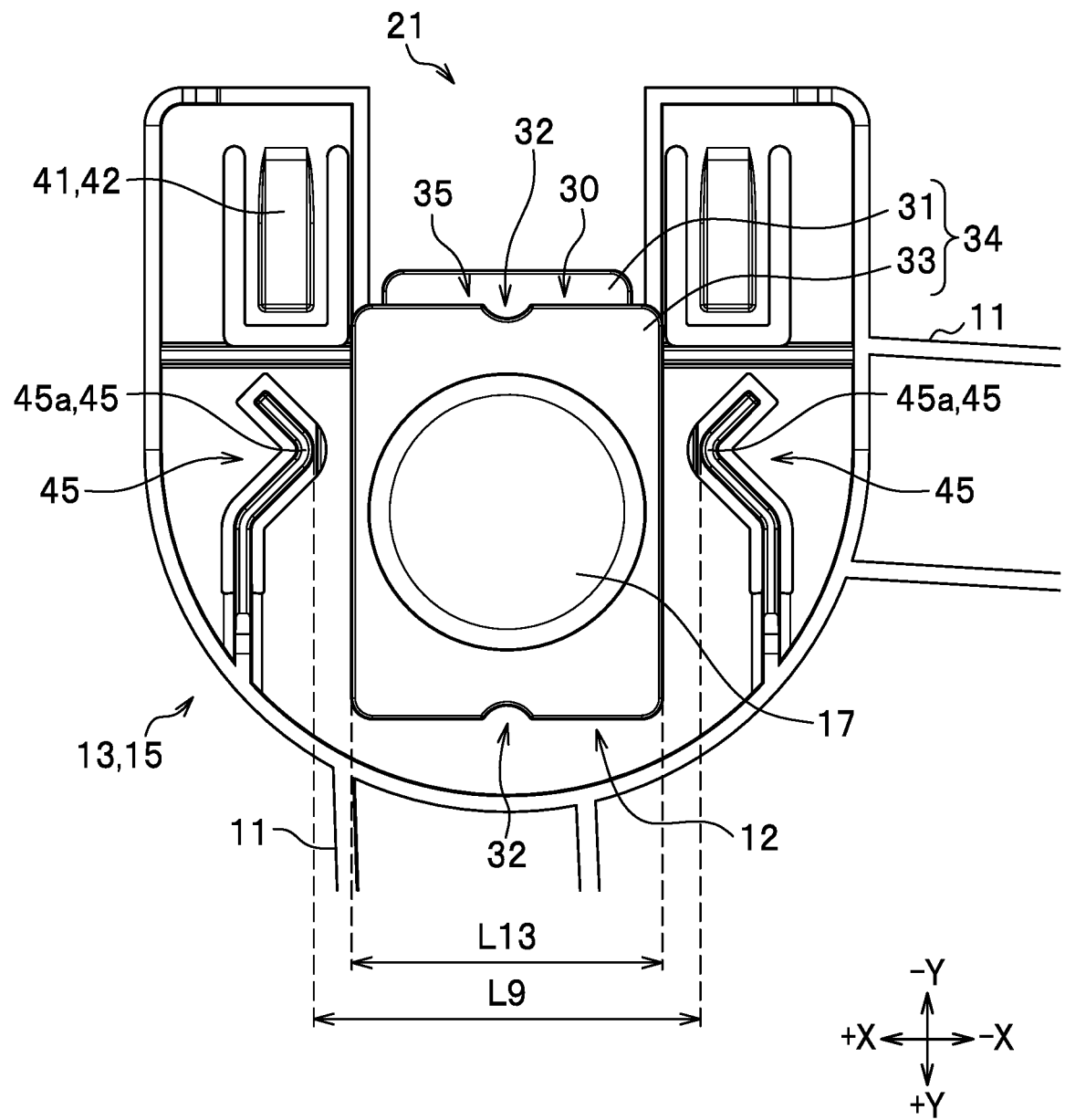
FIG. 13 is a bottom view of FIG. 10.

FIG. 13 is a bottom view of FIG. 10. As described above, the strut 12 is inserted into the open part 21 in the state of being turned by 90° from the direction shown in FIG. 10. A length in a traverse direction of the flat plate 33 is equivalent to a length L13. The length L13 is smaller than the length L9 in the x direction between the pair of lock parts 45 and 45. For this reason, the flat plate 33 does not come into contact with the pair of lock parts 45 and 45. Moreover, the flat plate 33 does not come into contact with the notches 32 provided to the flat plate 33 or the lock parts 45 provided to the slidable engaging part 13, either. Accordingly, in the state shown in FIG. 13, the lock parts 45 do not lock the flat plate 33 of the strut 12 or do not perform positioning. As a consequence, the strut 12 causes backlash so that the fastening error of the strut 12 to the slidable engaging part 13 can be detected.

Figure 14:
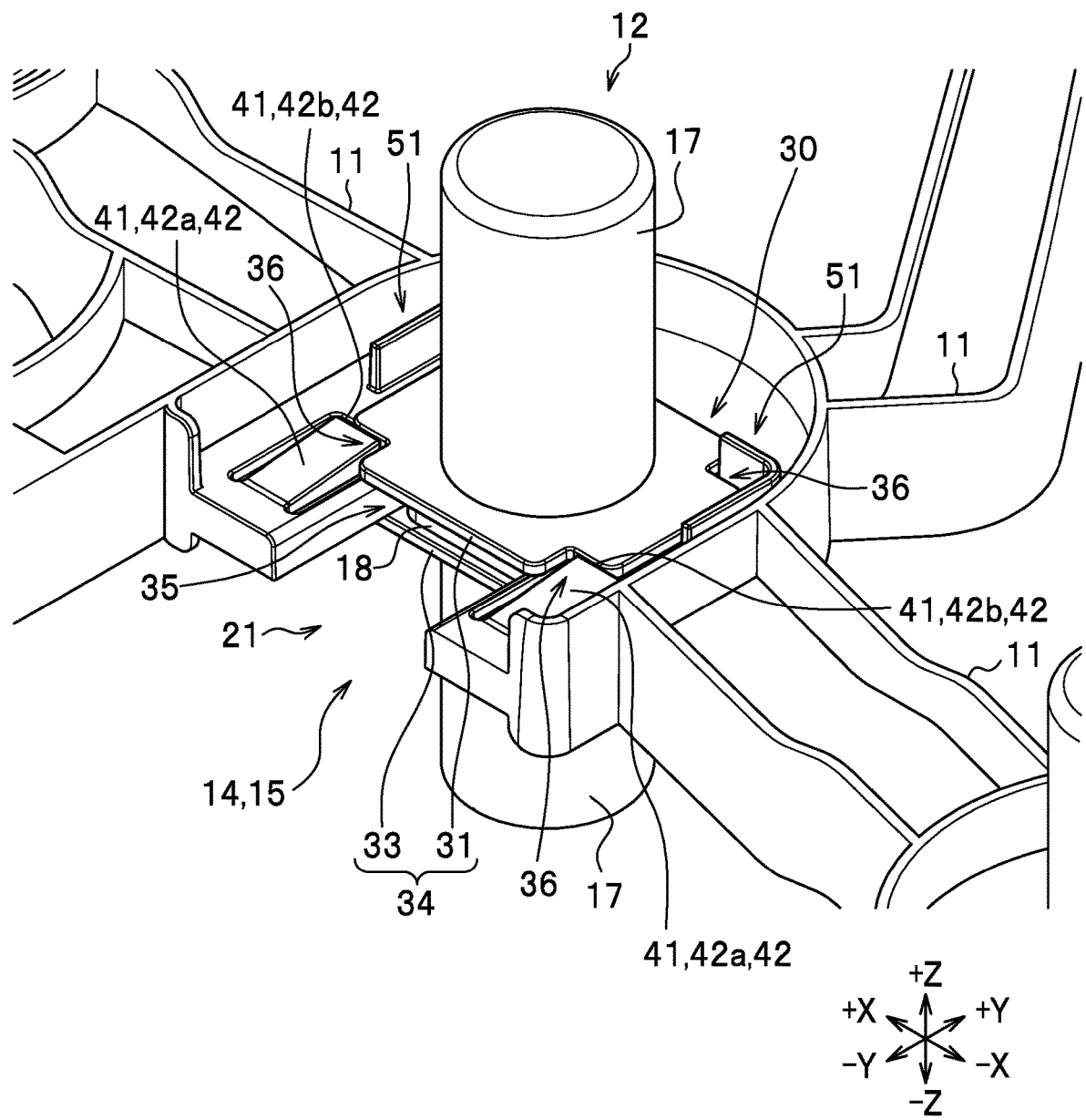
FIG. 14 is a perspective view of a fixed engaging part according to the first embodiment.

FIG. 14 is a perspective view of the fixed engaging part 14 according to the first embodiment. As with the slidable engaging part 13, the fixed engaging part 14 includes the sliding restriction members 41 to restrict the sliding of the clamp part 35 of the strut 12. However, unlike the slidable engaging part 13, the fixed engaging part 14 includes ribs 51. The clamp part 35 is disposed between the ribs 51 and the sliding restriction members 41.

Figure 15:
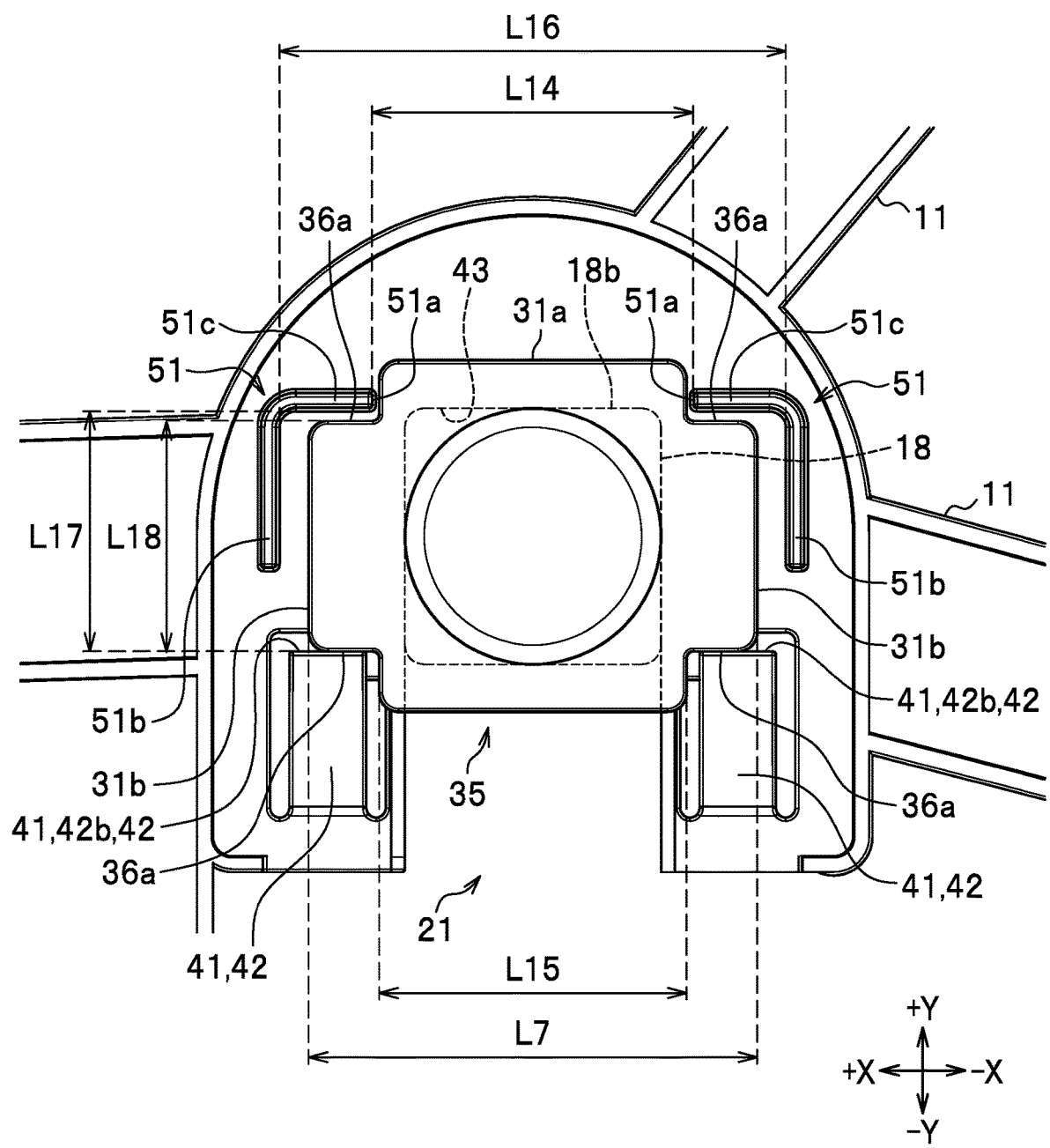
FIG. 15 is a top view of FIG. 14.

FIG. 15 is a top view of FIG. 14. A pair of ribs 51 are provided symmetrically across the flat plate 31. Each rib 51 only needs to have a shape that can restrict the position in the y direction of the flat plate 31. For example, the rib 51 has an L-shape that extends in two directions of a direction of the open part 21 (the y direction) as well as a direction parallel to the open part 21 (the x direction). In the example shown in the drawing, the rib 51 includes a rib 51c that extends in the x direction and a rib 51b that extends in the y direction. It is possible to position the strut 12 in the x direction at the time of fixation of the strut 12 by using the ribs 51c among these ribs. Although details will be described later with reference to FIG. 16, when inserting the strut 12 from the open part 21, it is possible to guide insertion in the +y direction by using the ribs 51b.

A distance between an end part 51a in the −x direction of one of the ribs 51 and an end part 51a in the +x direction of the other rib 51 is equivalent to a length L14. The length L14 is slightly greater than a length L15 of an end surface 31a being a portion of an end surface of the flat plate 31 extending in the x direction except the notches 36. Accordingly, a part of the flat plate 31 is disposed between the end parts 51a and 51a. In this way, positioning in the x direction of the strut 12 provided with the flat plate 31 is carried out.

A distance between the ribs 51b and 51b is equivalent to a length L16. The length L16 is greater than the length L7 being the length in the x direction of the flat plate 31. Accordingly, the flat plate 31 is disposed between the ribs 51b and 51b. Of the ribs 51, the ribs 51b extending in the y direction are opposed to respective end surfaces 31b of the flat plate 31 extending in the same direction (the y direction) as the slidable direction. Meanwhile, the ribs 51c are opposed to the respective end surfaces 36a in the y direction of the two notches 36 which are disposed on a far side from the open part 21. The ribs 51c are disposed on the opposite side of the open part 21 when viewed from the end surfaces 36a.

Unlike the slidable engaging part 13, the strut 12 provided with the flat plate 31 is fixed to the fixed engaging part 14. For this reason, the fixed engaging part 14 has a configuration in which one end side thereof is open and is provided with the open part 21 and the end surface 43 (a closed end surface) is formed on another side. The fixed engaging part 14 includes the sliding restriction members 41 located between the open part 21 and the end surface 43 and designed to restrict the sliding of the clamp part 35. The clamp part 35 is locked with the sliding restriction members 41 and the end surface 43. In the example shown in the drawing, a position in the y direction of the end surface 18b of the prism 18 constituting the clamp part 35 substantially coincides with a position in the y direction of the end surface 43 of the fixed engaging part 14. That is to say, the end surface 18b is in contact with the end surface 43. Meanwhile, positions in the y direction of the end surfaces 36a of the two notches 36 on the open part 21 side substantially coincide with positions in the y direction of the end parts 42b of the claws 42 constituting the sliding restriction members 41. That is to say, the end parts 42b are in contact with the end surfaces 36a. This configuration makes it possible to fix the strut 12 to the fixed engaging part 14.

A distance between the rib 51c and the end part 42b of the sliding restriction member 41 is equivalent to a length L17. Meanwhile, a length of the end surface 31b being a portion of an end surface of the flat plate 31 extending in the y direction except the notches 36 is equivalent to a length L18. The length L17 is greater than the length L18. Accordingly, the flat plate 31 is disposed between the end parts 42b of the sliding restriction members 41 and the ribs 51c.

Figure 16:
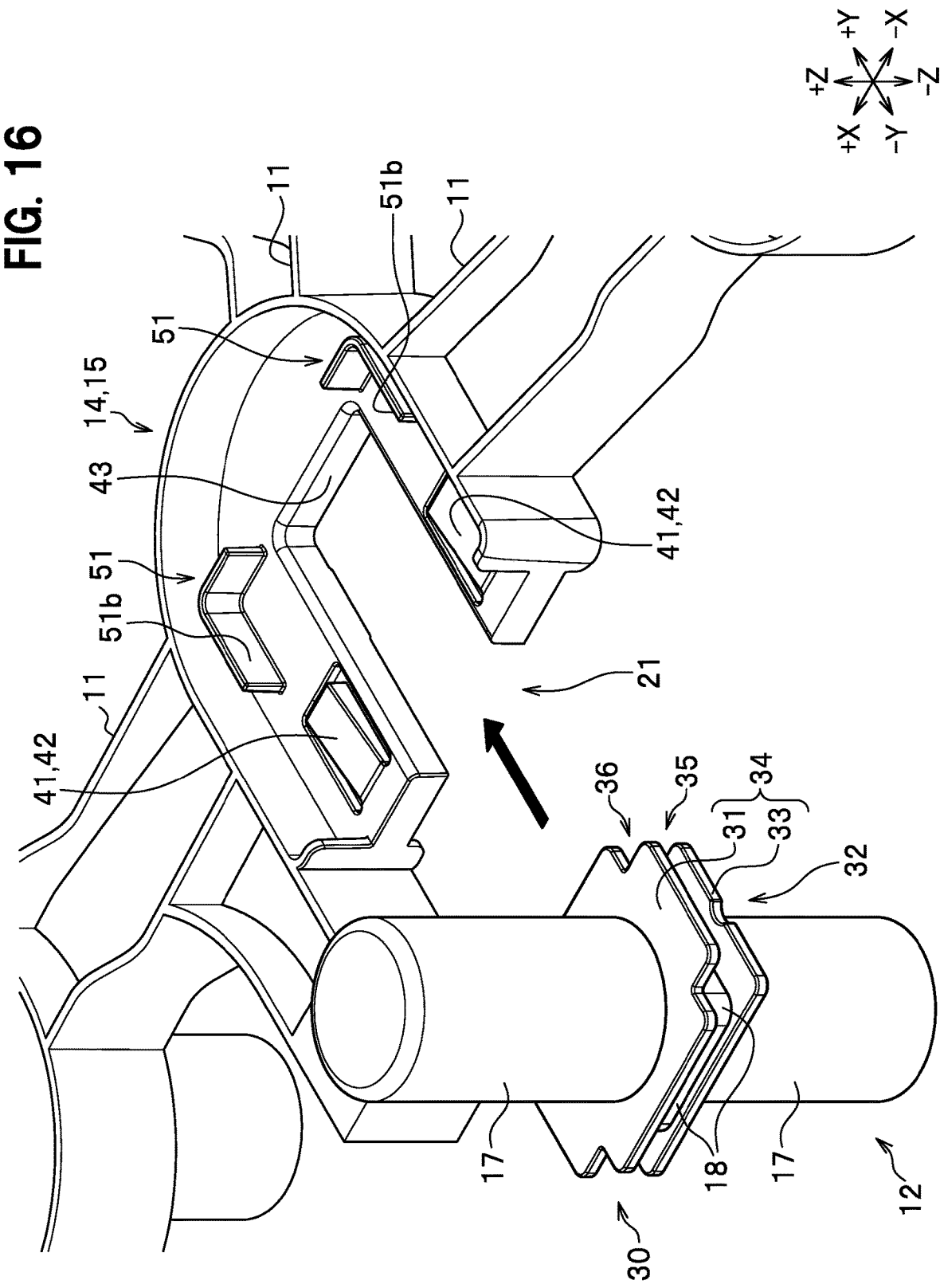
FIG. 16 is a view to explain fastening of the strut to the fixed engaging part according to the first embodiment.

FIG. 16 is a view to explain fastening of the strut 12 to the fixed engaging part 14 according to the first embodiment. The strut 12 is fastened to the fixed engaging part 14 by inserting the strut 12 into the open part 21 as indicated with a black arrow. The strut 12 is inserted into the open part 21 such that a direction to dispose the sliding restriction members 41 and 41 (the x direction) and the longitudinal direction of the flat plate 31 having the length L5 are aligned in the same direction. In this instance, insertion of the strut 12 in the +y direction is guided by the ribs 51b as described above. Thus, the strut 12 is fastened to the fixed engaging part 14 as shown in FIGS. 14 and 15.

When fastening the strut 12, a fastening error (a fastening defect) occurs in a case of an attempt to fasten the strut 12 to the fixed engaging part 14 in a different direction from the direction of the strut 12 shown in FIG. 16. The built-in component 10 can detect such a fastening error.

Figure 17:
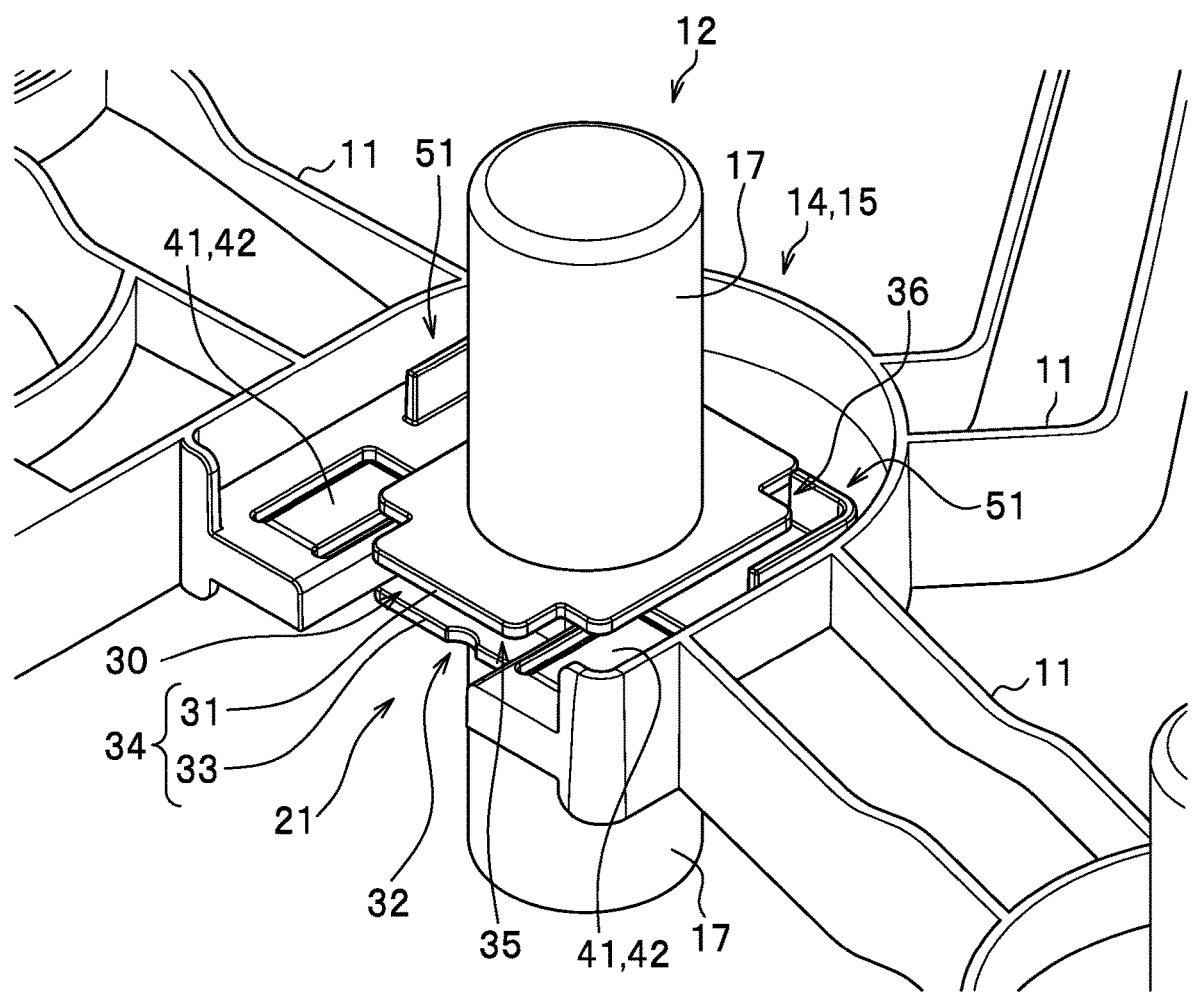
FIG. 17 is a view to explain a case of occurrence of a fastening error in the fastening in FIG. 16.

FIG. 17 is a view to explain the case of occurrence of the fastening error in fastening in FIG. 16. The example in FIG. 17 shows an aspect of inserting the strut 12 into the open part 21 in the state of turning the strut 12 by 90° within the xy plane relative to the direction shown in FIG. 16.

Figure 18:
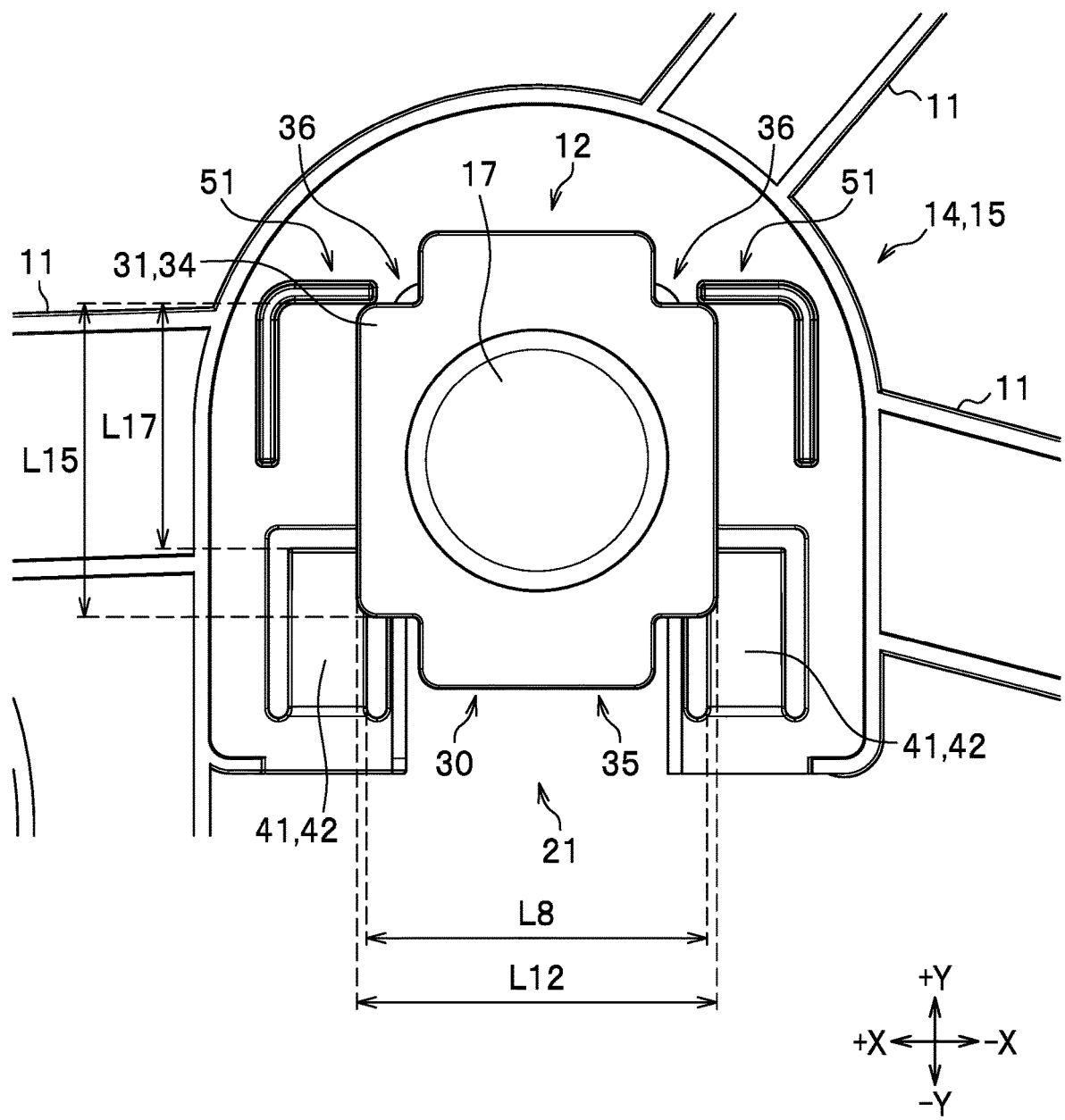
FIG. 18 is a top view of FIG. 17.

FIG. 18 is a top view of FIG. 17. An interval between the sliding restriction members 41 and 41 is equivalent to the length L8. Meanwhile, the length in the traverse direction of the flat plate 31 is equivalent to the length L12. The length L12 is greater than the length L8. For this reason, the flat plate 31 is disposed on the sliding restriction members 41 and 41 when the strut 12 is inserted into the open part 21.

Meanwhile, the length in the x direction of the end surface 31a being the portion of the end surface of the flat plate 31 extending in the x direction except the notches 36 is equivalent to the length L15. On the other hand, the distance between the rib 51c and the end part 42b of each sliding restriction member 41 is equivalent to the length L17. The length L14 is greater than the length L17. Accordingly, even when the flat plate 31 is inserted from the open part 21 into the deepest point, the flat plate 31 is not engaged with a space between the rib 51c and the end part 42b of the sliding restriction member 41 and the flat plate 31 remains disposed on the sliding restriction members 41 and 41. As a consequence, the strut 12 is not fixed and comes out with a small force. Thus, it is possible to detect a fastening error of the strut 12 to the fixed engaging part 14.

As described above, in the built-in component 10 provided to the fuel tank 1, the engageable part 30 of the strut 12 is slidably engaged with the engaging part 15 of the carrier part 11. As a consequence, it is possible to keep the carrier part 11 itself from becoming a non-rigid body, and to accurately dispose the built-in component 10 inside the fuel tank 1. This configuration can appropriately absorb the post-molding contraction of the fuel tank 1.

Meanwhile, the slidable directions of the multiple slidable engaging parts 13 are set to the directions toward the fixed engaging part 14. Accordingly, it is possible to absorb complex displacement of the fuel tank 1 due to the post-molding contraction more appropriate than the related art. In this way, it is possible to suppress detachment of the strut 12 from the fuel tank 1 associated with the post-molding contraction, and to improve reliability of the fuel tank 1.

Second Embodiment

Next, a second embodiment of the present invention will be described. A fuel tank according to the second embodiment is different from the above-described first embodiment mainly in that an engaging part 15A includes a biasing part (such as a leaf spring). In the second embodiment, explanations will be focused on features that are different from those in the first embodiment.

Figure 19:
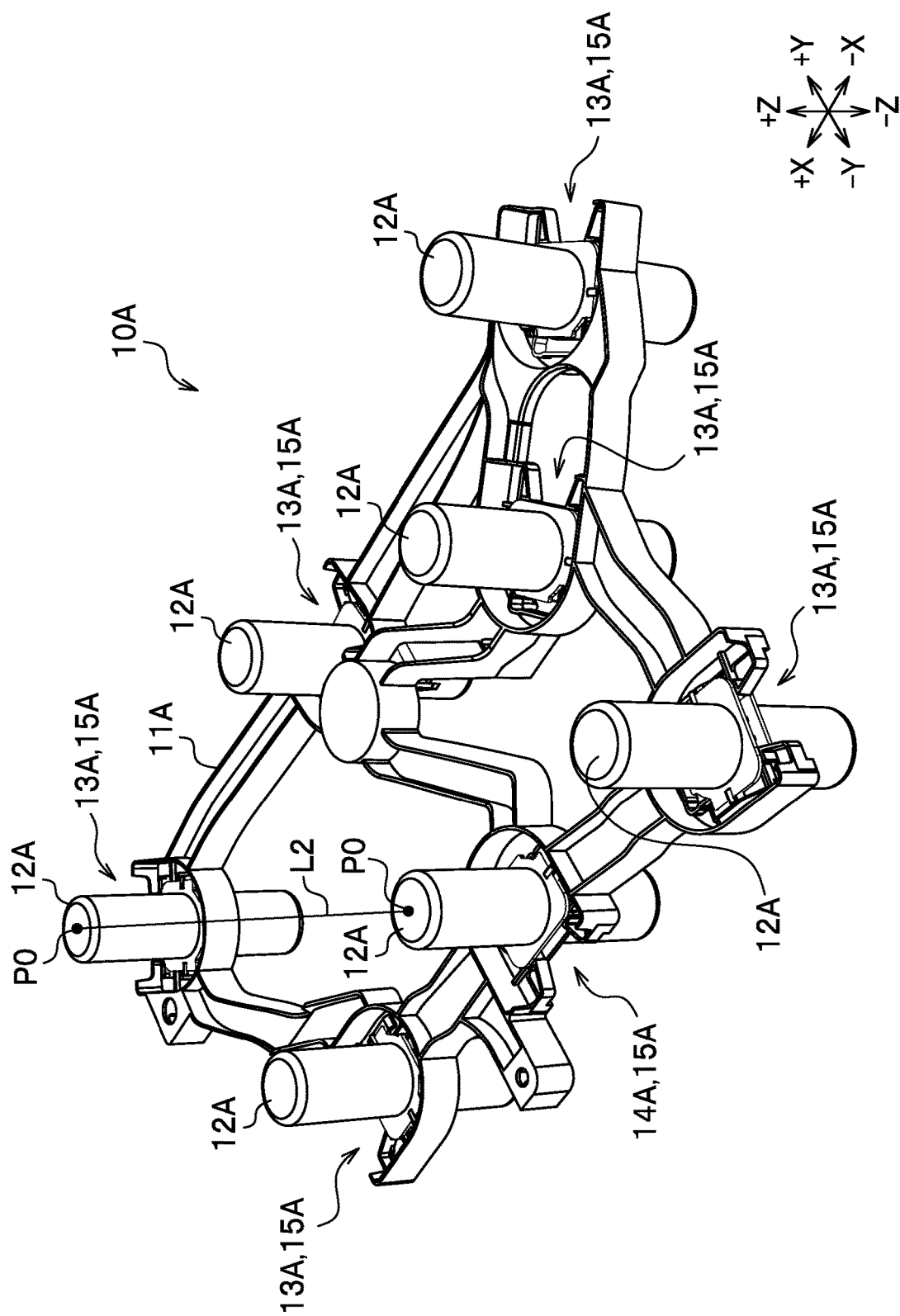
FIG. 19 is an external perspective view of a built-in component according to a second embodiment.

FIG. 19 is an external perspective view of a built-in component 10A according to the second embodiment. The built-in component 10A includes a carrier part 11A, struts 12A, slidable engaging parts 13A, and a fixed engaging part 14A. As with the first embodiment, the struts 12A are slidably engaged with the slidable engaging parts 13A (at six locations in this case). The sliding directions of the struts 12A are substantially the same as those in the first embodiment (see FIG. 4). On the other hand, the strut 12A is fitted into and thus engaged with the fixed engaging part 14A (at one location in this case) so as not to allow sliding movement of the strut 12A.

Figure 20:
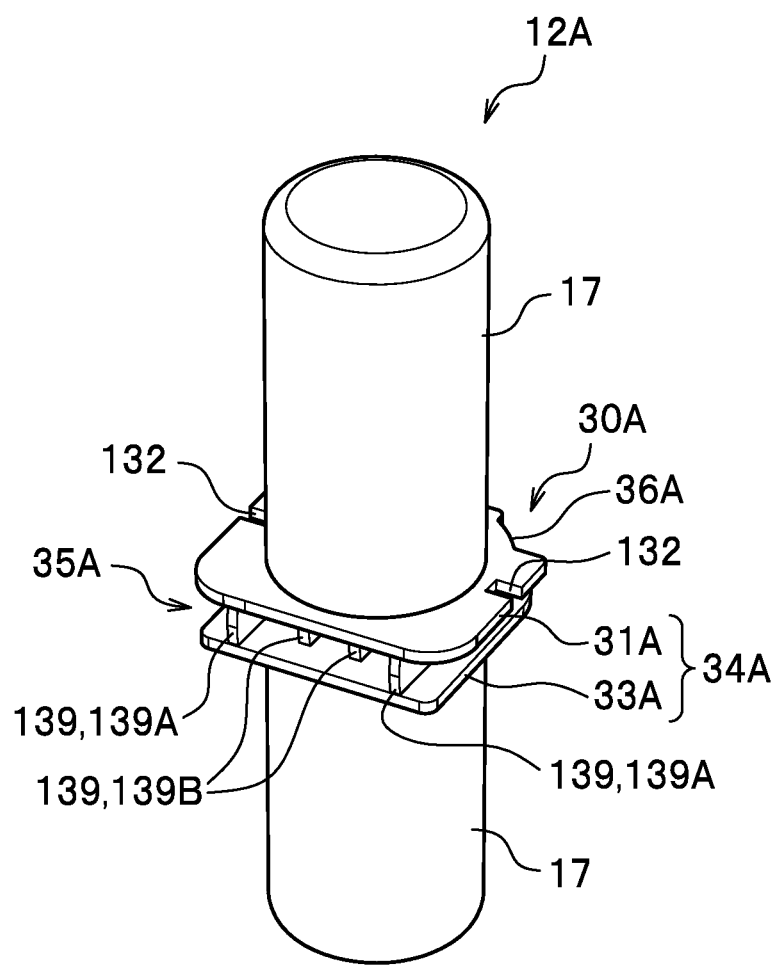
FIG. 20 is a perspective view of a strut according to the second embodiment.

FIG. 20 is a perspective view of the strut 12A according to the second embodiment. In the example shown in the drawing, the strut 12A is engageable with all engaging parts 15A including the slidable engaging parts 13A and the fixed engaging part 14A. Instead, the shape of the strut 12A to be engaged with the slidable engaging part 13A may be different from the shape of the strut 12A to be engaged with the fixed engaging part 14A, for example.

The strut 12A includes the support poles 17 each formed into the columnar shape, and an engageable part 30A. The engageable part 30A is a region to be engaged with each of the engaging parts 15A of the carrier part 11A. The support poles 17 of the same shape extend in the +z direction (an upward direction) and the −z direction (a downward direction) being the height direction of the engageable part 30A, respectively. End surfaces of the respective support poles 17 are fixed, respectively, to an inner surface of a tank body opposed thereto. The engageable part 30A includes a flat plate 31A provided with notches 36A and 36A on two corners on the +y side (see also FIG. 23). Temporary engaging parts (cutout parts) 132 are formed, respectively, on two sided opposed to each other in the x direction out of four sides of the flat plate 31A. Each temporary engaging part 132 is cut out at the end part of the flat plate 31A in such a way as to be open in the +x direction or the −x direction.

Meanwhile, the engageable part 30A includes a flat plate 33A that is disposed below the flat plate 31A and away from the flat plate 31A. The flat plate 33A has substantially the same size as the flat plate 31A, and takes on a rectangular shape or a generally rectangular shape. Note that the generally rectangular shape means a shape that is not a rectangle in a strict sense but is substantially a rectangle when viewed from above. To be more precise, the generally rectangular shape is a shape provided with corners formed into an R-shape by chamfering instead of forming right angles, for example.

The engageable part 30A includes a clamp part 35A. The clamp part 35A is a region to be engaged with the engaging part 15A (FIG. 19) by way of clamping with a group of flat plates 34A including the pair of flat plates 31A and 33A disposed to face each other. The clamp part 35A includes a solid pillar part 138 (see a portion indicated with a dotted line in FIG. 23) and multiple intermediate ribs 139 (four ribs herein) extending in the y direction from the pillar part 138, which are located in a gap between the pair of flat plates 31A and 33A. The intermediate ribs 139 are arranged in parallel in the y direction, respectively. As shown in FIG. 20, intermediate ribs 139A and 139A out of the intermediate ribs 139, which are located on two outer sides, extend longer in the −y direction than intermediate rib 139B and 139B located at the center.

Figure 21:
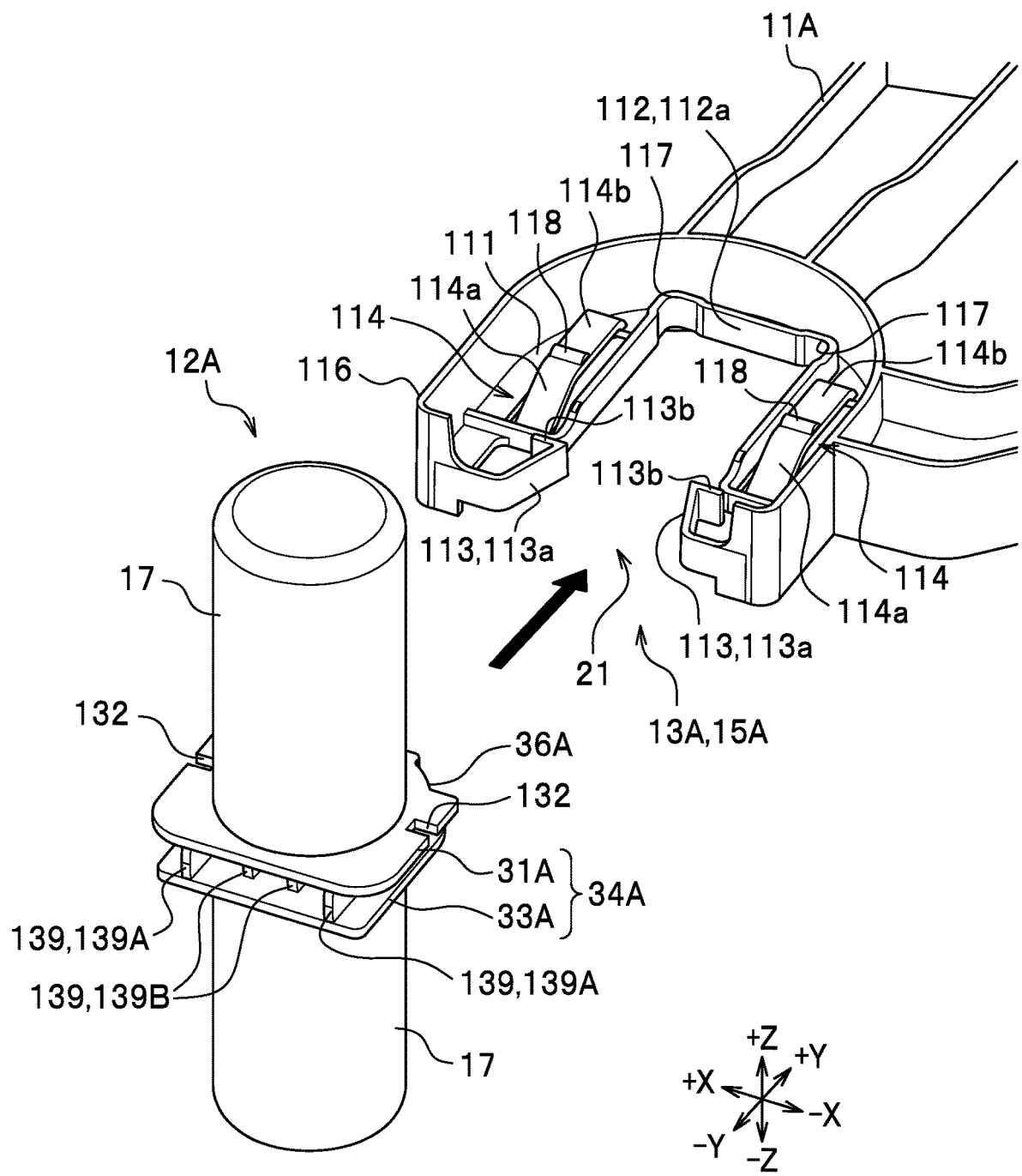
FIG. 21 is an exploded perspective view to explain fastening of the strut to a slidable engaging part according to the second embodiment.

FIG. 21 is an exploded perspective view to explain fastening of the strut 12A to the slidable engaging part 13A according to the second embodiment. The slidable engaging part 13A includes a base part 111, a recessed part 112, stopper-equipped guides 113, and biasing parts 114. The base part 111 is a plate-like member which takes on a horseshoe shape in plan view. A side wall 116 that rises from the base part 111 is provided at a rim part of the base part 111. The recessed part 112 is a recess that is open on the open part 21 side (the −y side), which is a region to be engaged with the strut 12A. Runout parts 117 and 117 are formed on two sides in the x direction at an end surface 112a on the +y side of the recessed part 112. Each runout part 117 is a region that is slightly recessed on the +y side from the end surface 112a of the recessed part 112. Although the runout parts 117 may be omitted, provision of the runout parts 117 as in the present embodiment makes it possible to surely avoid interference with the strut 12A in the case of the sliding of the strut 12A. Although the case of the base part 111 in the horseshoe shape in plan view has been described as an example, the base part 111 may be of a different shape.

A pair of stopper-equipped guides 113 are provided on the −y side of the base part 111. A height dimension of the stopper-equipped guides 113 is set smaller than a gap dimension between the flat plates 31A and 33A. That is to say, the stopper-equipped guides 113 are formed to be insertable into the gap between the flat plates 31A and 33A.

Each stopper-equipped guide 113 includes an arm part 113a and a claw part 113b. The arm part 113a extends obliquely from an end part on the −y side of the side wall 116 toward a center side, and a tip thereof is formed into a free end. The claw part 113b is a plate-like part which is provided at a tip of the arm part 113a and arranged parallel to the x direction. The arm parts 113a and 113a extend in the +y direction and are inclined toward the center in directions to come close to each other. Accordingly, the arm parts 113a and 113a can guide the strut 12A to the recessed part 112. A distance between the stopper-equipped guides 113 and 113 is smaller than a distance between the intermediate ribs (a distance between the intermediate ribs 139A and 139A on the outer sides). Accordingly, when the strut 12A is engaged with the recessed part 112 against elasticity of the arm parts 113a and 113a, the claw parts 113b and 113b are opposed to the intermediate ribs 139A and 139A. It is therefore possible to prevent the strut 12A from coming off the −y side.

Here, the strut 12A may be configured to be detachable by pushing and opening the stopper-equipped guides 113 and 113 after the strut 12A is engaged with the slidable engaging part 13A.

The biasing parts 114 are formed on two sides in the x direction of the base part 111 while interposing the recessed part 112 in between. In the present embodiment, each biasing part 114 is formed from a leaf spring having a rectangular shape in plan view, which rises in the +z direction from the base part 111. The biasing part 114 extends from the −y side to the +y side, and is formed at a position corresponding to an opening 115 (see FIG. 23) that provides an opening to the base part 111. Since a tip side (the +y side) of the biasing part 114 is formed into a free end, the biasing part 114 is provided with elasticity. The biasing part 114 includes a base end part 114a provided on a base end side and forming a large angle with the base part 111, and a tip part 114b provided on tip side and forming a small angle with the base part 111.

A temporary lock rib 118 extending in the x direction and taking on a convex shape is formed on an upper surface of the tip part 114b. The temporary lock rib 118 is formed to engage with the temporary engaging part (the cutout part) 132 of the flat plate 31A. As shown in FIG. 21, in a state before engagement of the strut 12A, a height dimension from the base part 111 to the tip part 114b is greater than the gap dimension between the flat plates 31A and 33A.

In order to engage the strut 12A with the slidable engaging part 13A, the notches 36A and 36A of the strut 12A are placed to face the slidable engaging parts 13A as shown in FIG. 21, and the two components are engaged with each other. By setting the notches 36A and 36A to face the slidable engaging part 13A side, it is possible to prevent a fastening error by using the notches 36A and 36A as marks.

Figure 22:
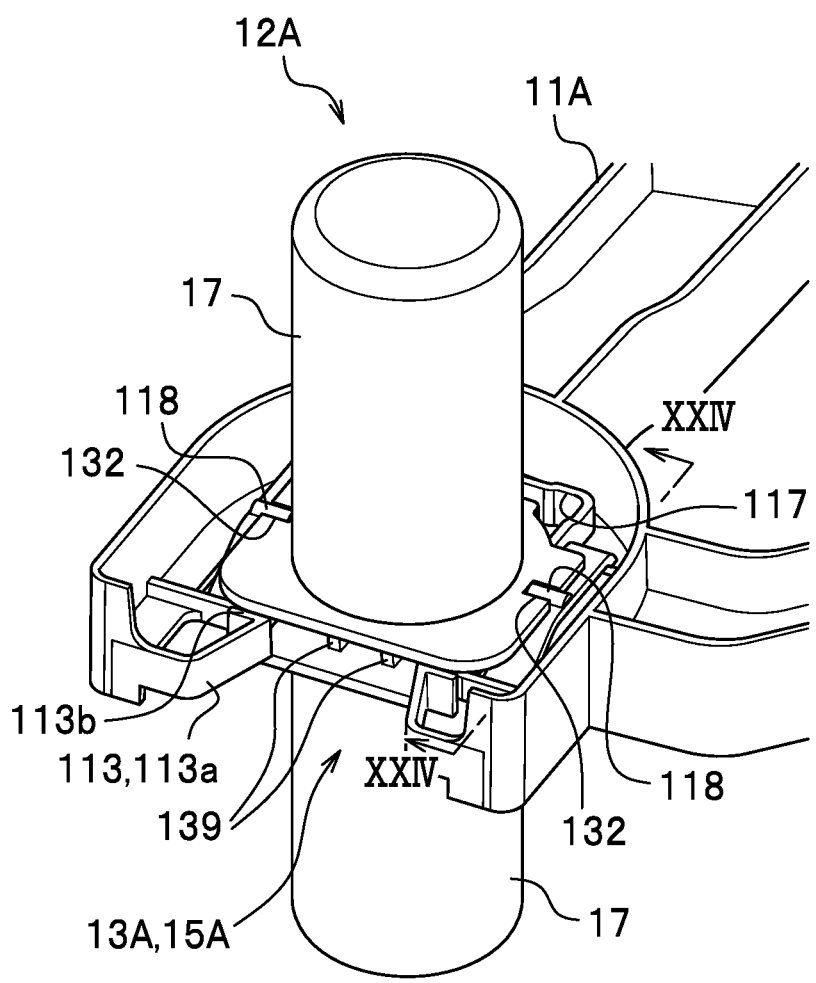
FIG. 22 is a perspective view showing a state where an engageable part of the strut is engaged with the slidable engaging part according to the second embodiment.
Figure 23:
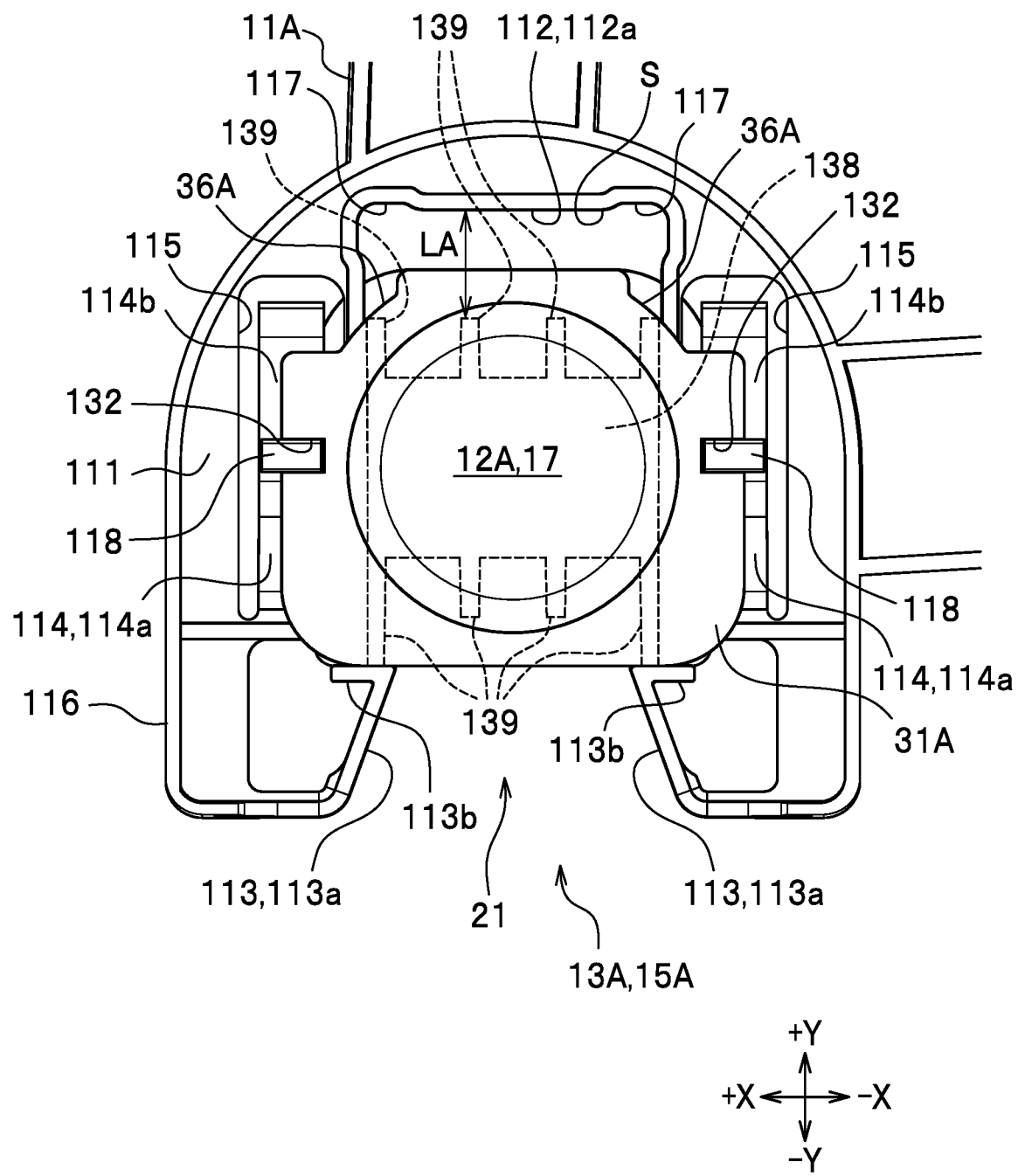
FIG. 23 is a top view of FIG. 22.
Figure 24:
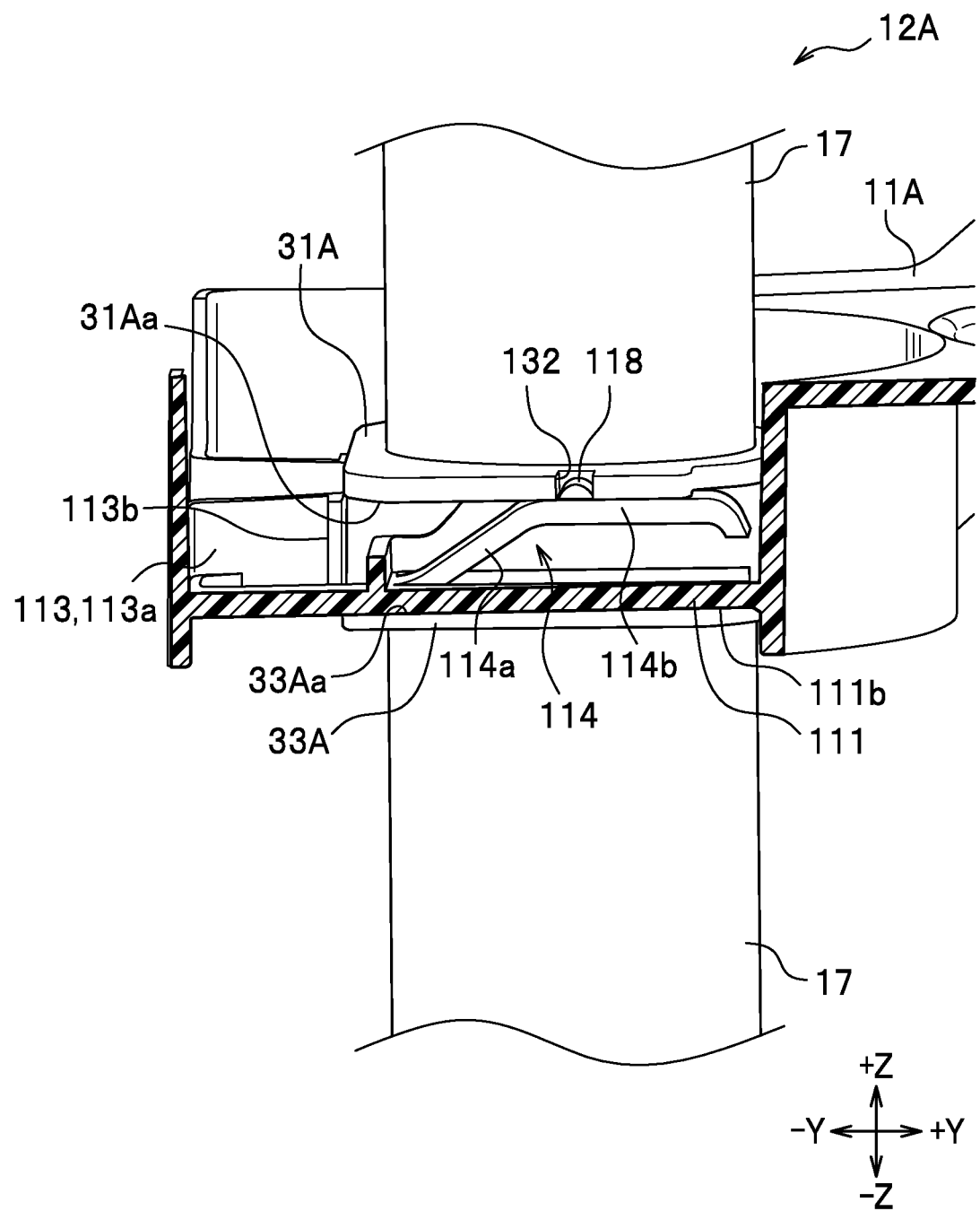
FIG. 24 is a cross-sectional view on arrow XXIV-XXIV in FIG. 22.

To be more precise, the stopper-equipped guides 113 and 113 are arranged in such a way as to enter the gap between the flat plates 31A and 33A of the strut 12A, and the strut 12A is caused to approach the slidable engaging part 13A. Thus, the strut 12A is guided to the stopper-equipped guides 113 and 113. When the strut 12A is caused to approach further, the temporary lock ribs 118 of the biasing parts 114 enter the temporary engaging parts 132 of the flat plate 31A and are engaged therewith as shown in FIGS. 22 to 24. This state is established as a "temporarily engaged state". Moreover, in this instance, the stopper-equipped guides 113 and 113 are restituted to the original condition and are opposed to the intermediate ribs 139A and 139A.

As shown in FIG. 23, a distance LA of a gap S from the end surface 112a of the recessed part 112 to the intermediate rib 139 is a sliding margin that enables the strut 12A to slide in molding of the fuel tank. The distance LA may be set constant for each of the slidable engaging parts 13A or changed depending on the slidable engaging parts 13A. It is preferable to set the distance LA as appropriate depending on degrees of the post-molding contraction. Note that the lengths on the +y side of the respective intermediate ribs 139 are set constant.

As shown in FIG. 24, in the temporarily engaged state, a lower surface 111b of the base part 111 comes into contact or surface contact with an upper surface (a lower contact surface) 33Aa of the flat plate 33A. In the meantime, the tip part 114b of the biasing part 114 being the leaf spring comes into contact or surface contact with a lower surface (an upper contact surface) 31Aa of the flat plate 31A. Since the biasing part 114 biases the base part 111 upward, it is possible to keep the strut 12A from being tilted relative to the base part 111. In other words, the biasing part 114 enters a space between the upper surface (the lower contact surface) 33Aa of the flat plate 33A and the lower surface (the upper contact surface) 31Aa of the flat plate 31A, and generates biasing forces in directions to move the upper surface (the lower contact surface) 33Aa away from the lower surface (the upper contact surface) 31Aa. Thus, it is possible to suppress backlash of the strut 12A relative to the base part 111. Moreover, since the temporary lock ribs 118 of the biasing parts 114 are engaged with the temporary engaging parts (the cutout parts) 132 of the flat plate 31A, the position in the depth direction (the y direction) is determined. Thus, it is possible to perform positioning of the strut 12A relative to the slidable engaging part 13A easily.

Here, each of the temporary lock ribs 118 of the biasing parts 114 and the temporary engaging parts 132 of the flat plate 31A is preferably formed into such a size and a shape that the temporarily engaged state can be released during occurrence of the post-molding contraction.

Figure 25:
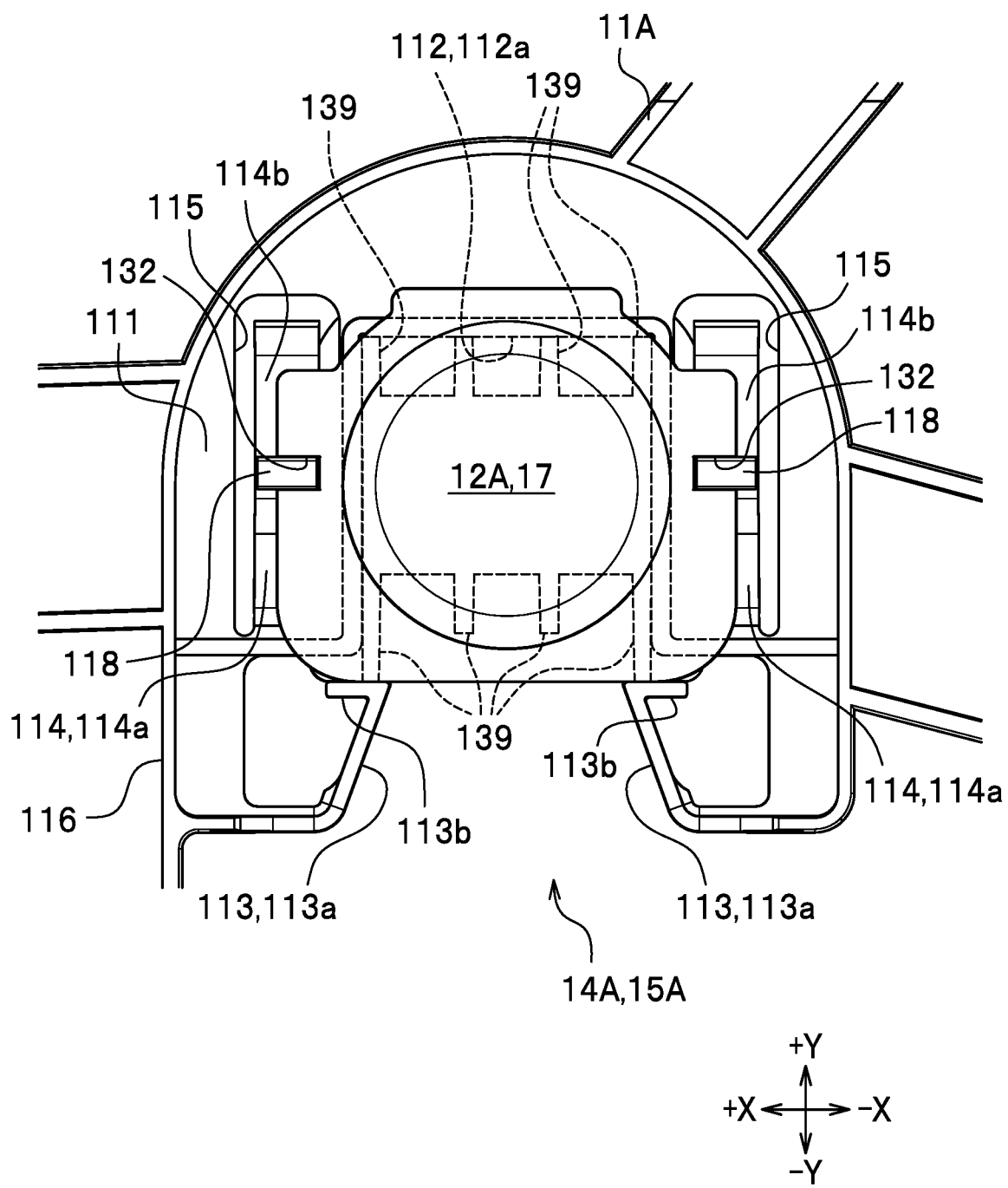
FIG. 25 is a top view showing a state where the engageable part of the strut is engaged with a fixed engaging part according to the second embodiment.

FIG. 25 is a top view showing a state where the engageable part of the strut 12A is engaged with the fixed engaging part 14A according to the second embodiment. The fixed engaging part 14A is different from the slidable engaging part 13A in that the strut 12A does not slide from the temporarily engaged state. As with the slidable engaging part 13A, when the temporarily engaged state is established, the strut 12A is engaged with the recessed part 112 and the temporary engaging parts 132 of the flat plate 31A are engaged with the temporary lock ribs 118 of the biasing parts 114. In this instance, the end surface 112a of the recessed part 112 comes into contact with the respective intermediate ribs 139 or is opposed to the intermediate ribs 139 with a small clearance in between. That is to say, fixed engaging part 14A is formed in such a way as to immobilize the strut 12A and to keep the strut 12A from sliding from the temporarily engaged state.

Figure 26:
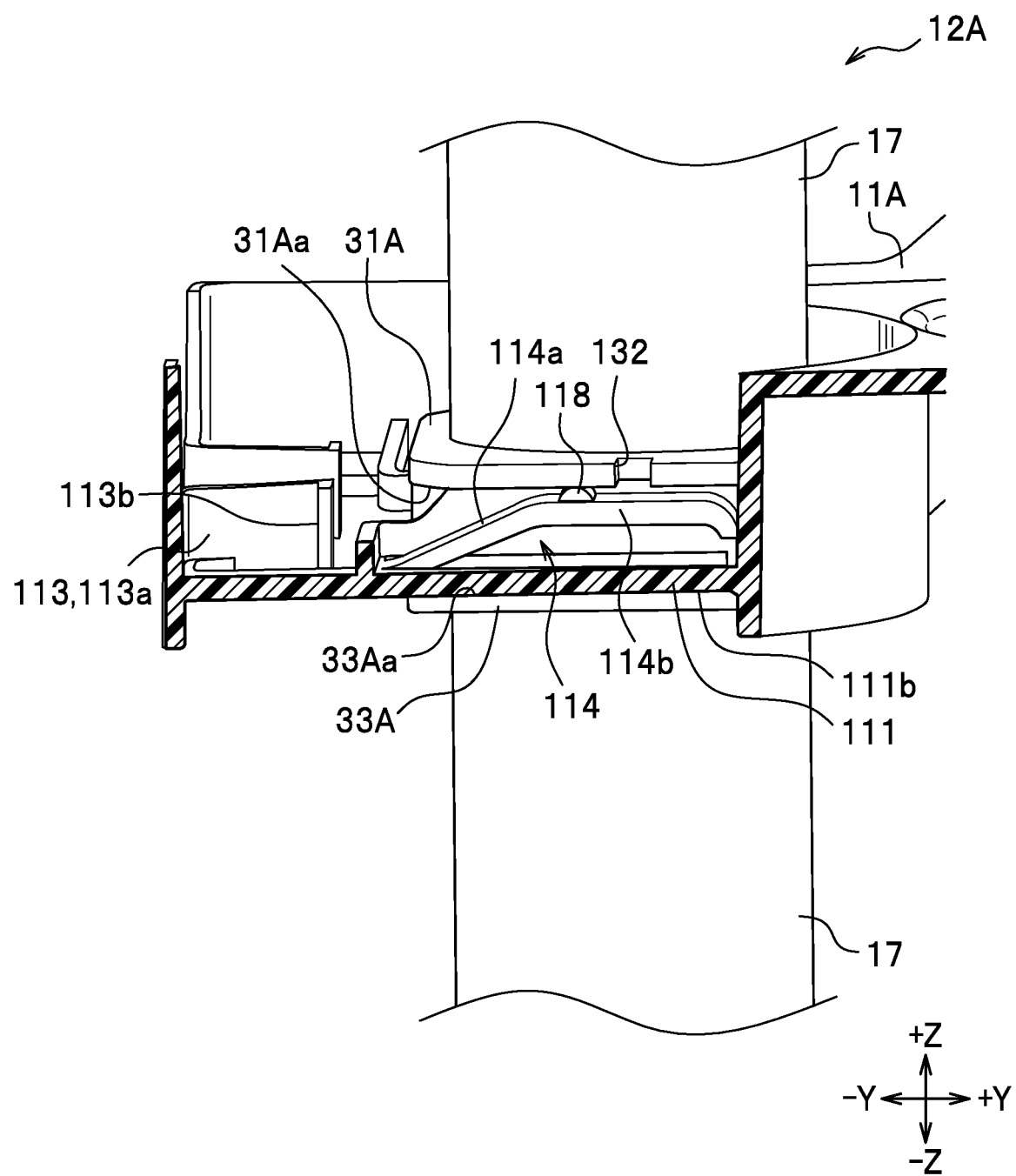
FIG. 26 is a cross-sectional view on arrow XXIV-XXIV in FIG. 22, which shows a state after sliding of the strut.

FIG. 26 is a cross-sectional view on arrow XXIV-XXIV in FIG. 22, which shows the state after sliding of the strut 12A. As with the first embodiment, the strut 12A engaged with the slidable engaging part 13A also slides toward the fixed engaging part 14A when the post-molding contraction occurs in the second embodiment. As shown in FIG. 26, in the present embodiment, the temporary lock rib 118 of the biasing part 114 comes off the temporary engaging part 132 of the flat plate 31A, and the strut 12A moves in the +y direction (to the back side of the slidable engaging part 13A) relative to the slidable engaging part 13A (the carrier part 11A). In other words, the fuel tank according to the second embodiment has a temporary engagement structure designed to, when the strut 12A and the slidable engaging part 13A (the carrier part 11A) cause a relative displacement, allow the relative displacement of them by releasing the temporary engagement. When the post-molding contraction is terminated, the strut 12A is fixed (immobilized) to the parison (the opposed inner surface of the tank body) at that position.

Here, in the case of the related art such as the invention according to Patent Literature 1 described above, for instance, there may be an initial gap (an initial clearance) between the carrier part and the strut or a gap may be generated therebetween due to tolerance. When there is the gap between the carrier part and the strut as mentioned above, the strut may be tilted relative to the carrier part in the course of transportation using a transportation device such as a robot arm, and the strut may be fixed in the tilted state. Hence, there is a problem of causing a joint failure or a failure to obtain a desired strength.

However, according to the fuel tank of the present embodiment, it is possible to keep the strut 12A from tilting relative to the slidable engaging part 13A (the carrier part 11A) by using the biasing forces of the biasing part 114. This makes it possible to improve molding accuracy of the fuel tank.

Meanwhile, it is possible to construct the biasing structure easily by forming the biasing part 114 from the leaf spring. Note that the biasing part 114 may adopt a different mode. That is to say, the biasing part 114 only needs to adopt a configuration to enter the space between the flat plate 31A and the flat plate 33A so as to be able to apply the bias in the directions to move these flat plates away from each other.

Meanwhile, according to the related art, the post-molding contraction occurs during curing of the parison in the case of molding the fuel tank. Hence, the built-in component (the struts) may be fixed in a manner misaligned with the fuel tank.

On the other hand, according to the present embodiment, the strut 12A and the carrier part 11A can be relatively displaced in the slidable engaging part 13A. Hence, the strut 12A also slides to the position following the post-molding contraction. By setting the sliding margin depending on the post-molding contraction, it is possible to fix the strut 12A at a desired position. Moreover, the provision of the temporary engagement structure (the temporary lock ribs 118 and the temporary engaging parts 132) makes it possible to conduct positioning between the engaging part (the slidable engaging part 13A) and the strut 12A. In this way, a sliding distance of each strut 12A can be controlled easily so that the molding accuracy can be improved further.

In the meantime, as shown in FIG. 24, the biasing part 114 can maintain the temporarily engaged state stably by keeping the upper surface of the tip part 114b of the biasing part 114 and the lower surface (the upper contact surface) 31Aa of the flat plate 31A into surface contact with each other in the temporarily engaged state. Moreover, the engaged state can be maintained more stably by providing the pair of biasing parts 114 on the two sides in the x direction of the recessed part 112.

The embodiments of the present invention have been described above. It is to be noted, however, designs can be changed as appropriate within the range not departing from the scope of the present invention. For example, the above-described embodiments are each configured to cause the strut to slide in the case of the occurrence of the post-molding contraction. Instead, the present invention is applicable to a configuration in which all the struts do not slide relative to the carrier part. In this case, the temporary engagement structure (the temporary lock ribs 118 and the temporary engaging parts 132) may be omitted.

Meanwhile, in the present invention, the lower surface of the flat plate 31A is defined as the upper contact surface while the upper surface of the flat plate 33A is defined as the lower contact surface. Instead, the upper contact surface and the lower contact surface may be surfaces of other regions. In the meantime, in the present embodiment, the biasing part 114 extends from the −y direction to the +y direction. Instead, the biasing part 114 may extend in a different direction. Meanwhile, the biasing parts 114 may extend in the same direction or extend in different directions. In the meantime, the biasing parts 114 may be disposed in such a way as to surround the strut 12A. Meanwhile, in the present embodiment, the tip part 114b of the biasing part 114 comes into contact with the flat plate 31A. Instead the tip part 114b of the biasing part 114 may come into contact with the flat plate 33A.

REFERENCE SIGNS LIST 1 fuel tank
10 built-in component
11 carrier part
12 strut
13 slidable engaging part
14 fixed engaging part
15 engaging part
30 engageable part
32 notch
33 flat plate
35 clamp part
36 notch
41 sliding restriction member
42 claw
42a inclined surface
42b end part
43 end surface (closed end surface)
45 lock part
10A built-in component
11A carrier part
12A strut
13A slidable engaging part
14A fixed engaging part
15A engaging part
31A flat plate
31Aa lower surface (upper contact surface) of flat plate 31A
33A flat plate
33Aa upper surface (lower contact surface) of flat plate 33A
111 base part
114 biasing part (leaf spring)
118 temporary lock rib
132 temporary engaging part

The invention claimed is:

1. A fuel tank comprising:
a built-in component, wherein
the built-in component includes
a carrier part being a rigid body including a plurality of engaging parts, and
a plurality of struts each including an engageable part to be engaged with one of the engaging parts, the engageable part of the strut includes an upper contact surface and a lower contact surface, which are formed spaced apart from each other in a height direction, the engaging parts of the carrier part each includes: an open part into which the engageable part of the strut is inserted in a first direction orthogonal to the height direction; a slidable region continuous with the open part and allowing the strut to slide in the first direction; and a biasing part that, when the strut is engaged with the engaging part, enters a space between the upper contact surface and the lower contact surface and generates biasing forces to move the upper contact surface and the lower contact surface away from each other in the height direction, and the fuel tank further comprises a temporary engagement structure which includes a temporary lock rib provided to the biasing part and a temporary engaging part provided to the engageable part, and which brings the temporary lock rib into temporary engagement with the temporary engaging part and, when the strut and the carrier part cause a relative displacement, allows the strut to slide in the slidable region by releasing the temporary engagement.

2. A fuel tank comprising:

a built-in component, wherein the built-in component includes a carrier part being a rigid body including a plurality of engaging parts, and a plurality of struts each including an engageable part to be engaged with one of the engaging parts, the engageable part of the strut includes an upper contact surface and a lower contact surface, which are formed spaced apart from each other in a height direction, the engaging parts of the carrier part each includes: an open part into which the engageable part of the strut is inserted in a first direction orthogonal to the height direction;

a slidable region continuous with the open part and allowing the strut to slide in the first direction; and a biasing part that, when the strut is engaged with the engaging part, enters a space between the upper contact surface and the lower contact surface and generates biasing forces to move the upper contact surface and the lower contact surface away from each other in the height direction, and the biasing part of the engaging part is a leaf spring extending in a height direction from a base part.

\* \* \* \* \*